US 6,541,951 B2

(12) United States Patent
Shirane et al.

(10) Patent No.: US 6,541,951 B2
(45) Date of Patent: Apr. 1, 2003

(54) OPTICAL MEASUREMENT OF TARGET-LIGHT WAVEFORM

(75) Inventors: Masayuki Shirane, Tokyo (JP);
Hiroyuki Yokoyama, Tokyo (JP);
Hirohito Yamada, Tokyo (JP);
Hisakazu Kurita, deceased, late of Ehime (JP), by Chizuko Kurita, legal representative

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 09/759,821

(22) Filed: Jan. 11, 2001

(65) Prior Publication Data

US 2002/0024689 A1 Feb. 28, 2002

(30) Foreign Application Priority Data

Jan. 11, 2000 (JP) ........................................ 2000-003036

(51) Int. Cl.$^7$ .............................................. G01R 23/14
(52) U.S. Cl. ...................... 324/76.41; 359/326; 359/110
(58) Field of Search .................................. 359/110, 326, 359/495, 497; 324/76.41

(56) References Cited

U.S. PATENT DOCUMENTS 6,154,309 A * 11/2000 Otani ........................... 359/326

FOREIGN PATENT DOCUMENTS

| EP | 0 903 567 | * 3/1999 |
| JP | 8-29814 | 2/1996 |
| JP | 9-138165 | 5/1997 |
| JP | 9-160082 | 6/1997 |

* cited by examiner

Primary Examiner—Christine K. Oda
(74) Attorney, Agent, or Firm—Scully, Scott, Murphy & Presser

(57) ABSTRACT

A method for measuring the waveform of light is provided, which makes it possible to synchronize easily the phase of sampling light with the phase of target light even if the target light is ultra-high speed pulsed light and is transmitted by way of long transmission channel, and to measure the waveform of target light with sufficient time resolution in real time. The method comprises the steps of: (a) generating sampling light having a pulse width sufficiently narrower than that of the target light from the target light; a repetition frequency of the sampling light having a constant difference with respect to a repetition frequency of the target light; (b) supplying the sampling light and the target light to a nonlinear optical member to generate cross-correlated light between the sampling light and the target light; and (c) measuring waveform of the target light based on the cross-correlated light. Preferably, the step (a) comprises the sub-steps of (a-1) extracting clock light from the target light; the clock light being synchronized with the target light; (a-2) generating an electrical clock signal from the clock light; (a-3) generating an electrical driving signal in such a way that a constant frequency difference exists between a frequency of she electrical driving signal and that of the electrical clock signal; and (a-4) generating the sampling light based on the electrical driving signal.

36 Claims, 13 Drawing Sheets

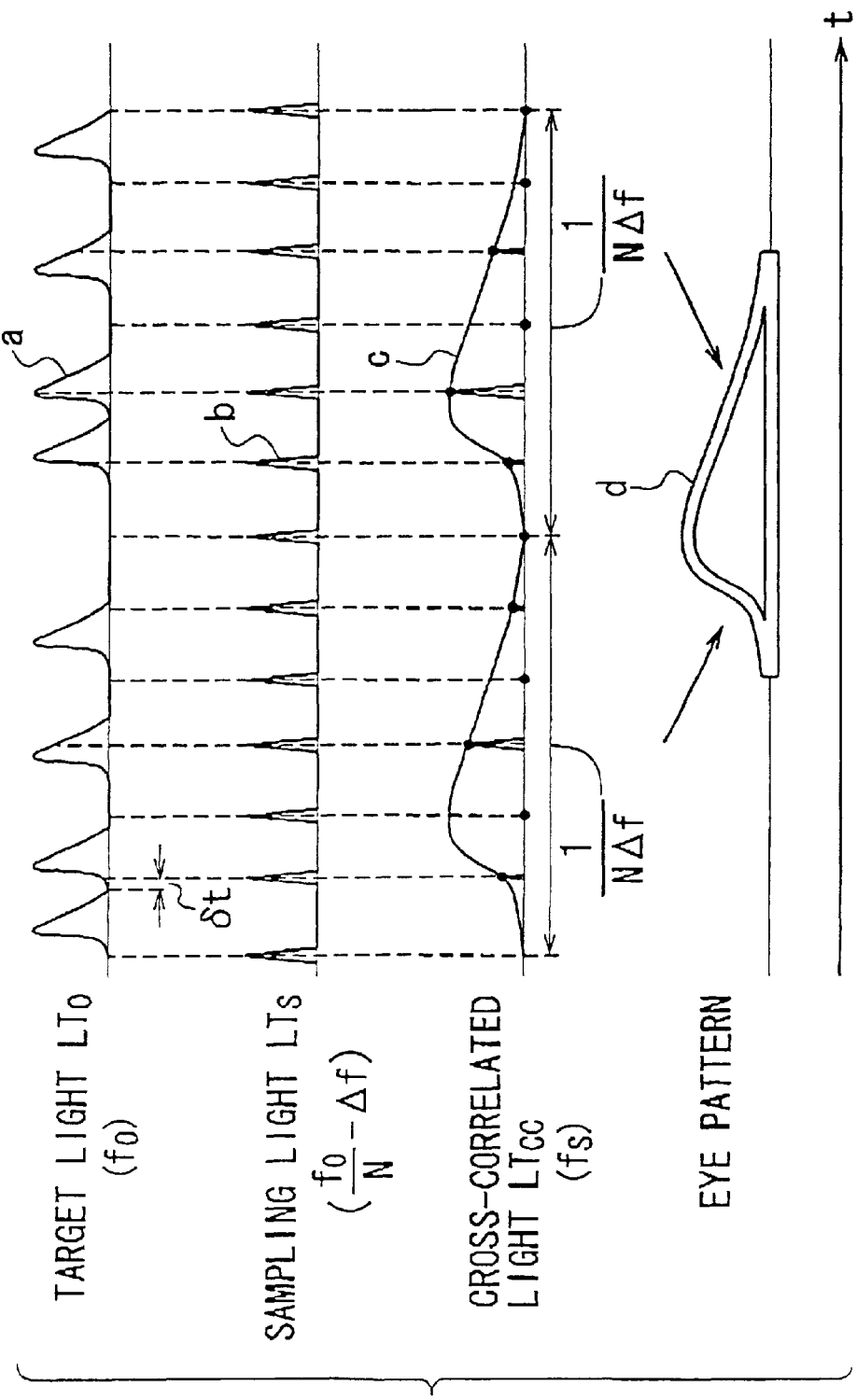

OPTICAL MEASUREMENT OF TARGET-LIGHT WAVEFORM

BACKGROUND OF THE INVENTION

1. Field of the Invention

The present invention relates to optical measurement of the waveform of target light and more particularly, to a method of measuring the waveform of target light and an apparatus for measuring the same, which are applicable to measurement of the waveform of ultra-high speed pulsed light used for optical communication and/or optical information processing.

2. Description of the Related Art

In recent years, the capacity of data to be transmitted in optical communications systems has been increasing rapidly and accordingly, not only the techniques for the wavelength multiplexing method that transmits the data using different wavelengths of signal light but the techniques for raising the data transmission rate in each wavelength to 100 Gb/s or higher have been being researched and developed actively. Under such circumstances, there have been the increasing need to develop the techniques for generating stable, coherent, ultra-high speed optical pulses and to measure the waveform of the ultra-high speed optical pulse train in real time with sufficiently high time resolution. In particular, the "eye pattern measurement" that measures directly an optical pulse train modulated by random bit data is essential to evaluate the characteristics of optical transmission systems.

A typical one of the known methods of measuring optical pulse trains is to use a ultra-high speed photoelectric converter and an electrically sampling oscilloscope. In this case, the "eye pattern measurement" can be performed, but in the present circumstances, the higher end of the measurable frequency range of light is, at most, approximately 40 GHz. As a result, it is difficult to measure the waveform of ultra-high speed optical pulse trains having a data transmission rate that exceeds about 40 Gb/s in each wavelength in real time with sufficiently high time resolution.

To solve the above-described difficulty, a method of measuring the waveform of target light has been developed and actually used. In this method, pulsed target light to be measured and pulsed sampling light having a sufficiently narrower pulse width than the target light is supplied to a specific nonlinear optical member, thereby generating intensity cross-correlated light between the target light and the sampling light due to nonlinear optical effects. On the basis of the cross-correlated light thus generated, the waveform of the target light is measured. In this method, the target light can be optically sampled and therefore, the above-described difficulty can be solved. Specifically, the waveform of ultra-high speed optical pulses having a data transmission rate that exceeds about 40 Gb/s in each wavelength can be measured in real time with sufficiently high time resolution.

Examples of the prior-art apparatuses of this type for measuring the waveform of target light pulses using the above-described method are disclosed in the Japanese Non-Examined Patent Publication No. 8-29814 published in 1996 and the Japanese Non-Examined Patent Publication No. 9-160082 published in 1997. FIG. 1 shows a typical one of the prior-art apparatuses of this type, in which thick lines with arrows indicate the flow of optical signals while thin lines with arrows indicate the flow of electrical signals.

The prior-art measuring apparatus 200 comprises a driving signal oscillator 262, a sampling light source 263, a nonlinear optical member 264, an optical filter 265, an optical detector 266, an electrical signal processing circuit 267, and a display device 268. The apparatus 200 itself is electrically and optically connected to an external apparatus 261.

The external apparatus 261 includes a driving signal oscillator 271 that oscillates an electrical driving signal $SD_1$ with a frequency $f_0$ and a target light source 272 that is driven by the oscillator 271 to emit pulsed target light $LT_0$. The target light $LT_0$ thus emitted has a repetition frequency equal to the frequency $f_0$ of the driving signal $SD_1$. An example of the waveform of the target light $LT_0$ is shown by the waveform a in FIG. 14.

The oscillator 262, which is electrically connected to the oscillator 271 provided in the external apparatus 261, oscillates a driving signal $SD_2$ having a frequency $f_S$ synchronized in phase with the driving signal $SD_1$ having the frequency $f_0$. The reason why the oscillator 262 is electrically connected to the oscillator 271 is to synchronize the phase of the target light $LT_0$ with the phase of the sampling light $LT_S$. Because of the phase synchronization between the light $LT_0$ and $LT_S$, the fluctuation of time difference $\delta t$ of each pulse of the target light $LT_0$ from each pulse of the sampling light $LT_S$, (i.e., mutual jitter), is decreased. Thus, the time resolution can be prevented from degrading. In principle, possible time resolution is approximately equal to the pulse width of the sampling light $LT_S$.

The sampling light source 263 is driven by the driving signal oscillator 262, emitting the pulsed sampling light $LT_S$. The sampling light $LT_S$ thus emitted has a repetition frequency $f_S$, where $f_S=(f_0/N)-\Delta f$, $f_0$ is the repetition frequency of the target light $LT_0$, $\Delta f$ is a frequency difference, and N is a natural number (i.e., N=1, 2, 3, 4, . . .). The repetition frequency $f_S$ of the sampling light $LT_S$ is slightly different by $\Delta f$ from the divided frequency of the target light $LT_0$ by N, i.e., $(f_0/N)$. For example, when N=1, the sampling light $LT_S$ has a waveform b shown in FIG. 14. In this case, each pulse of the sampling light $LT_S$ has a time difference $\delta t$ from the corresponding pulse of the target light $LT_0$.

The target light $LT_0$ and the sampling light $LT_S$ thus generated enters the nonlinear optical member 264, emitting intensity cross-correlated light $LT_{CC}$ between the light $LT_0$ and $LT_S$ thus supplied.

The nonlinear optical member 264 may be made of a ferroelectric crystal such as KTP ($KTiOPO_4$) that causes a secondary nonlinear optical effect, e.g., the Sum Frequency Generation (SFG). Alternately, the member 264 maybe formed by a semiconductor optical amplifier or a quartz-system optical waveguide such as an optical fiber that causes a tertiary nonlinear optical effect, e.g., the Four Wave Mixing (FWM). The member 264 is used to emit the intensity cross-correlated light $LT_{CC}$ between the pulses of the target light $LT_0$ and the sampling light $LT_S$. For example, the cross-correlated light $LT_{CC}$ thus emitted has a waveform shown by the waveform c in FIG. 14. The cross-correlated light $LT_{CC}$ has a repetition frequency equal to the repetition frequency $f_S$ of the sampling light $LT_S$.

Here, the time difference $\delta t$ of the pulse of the sampling light $LT_S$ from the corresponding pulse of the target light $LT_0$ corresponds to the sampling time. Thus, it is expressed by the following equation (1).

$$\delta t = \frac{1}{f_s} - \frac{N}{f_0} \cong \frac{\Delta f}{f_s^2} \quad (1)$$

For example, when the repetition frequency $f_S$ of the sampling light $LT_S$ is set as 1 GHz and the frequency difference $\Delta f$ is set as 100 kHz, the time difference $\delta t$ is given as 0.1 ps (picosecond) by the equation (1).

The optical filter 265 removes the target light $LT_O$ and the sampling light $LT_S$ and their secondary and higher harmonics (which serve as background light $LT_B$ of the intensity cross-correlated light $LT_{CC}$), allowing only the cross-correlated light $LT_{CC}$ to pass through the filter 265.

The optical detector 266 photoelectrically converts the cross-correlated light $LT_{CC}$ thus passed through the filter 265 to generate a pulsed electrical signal $S_{CC}$. The signal $S_{CC}$ is supplied to the signal processing circuit 267.

The detector 266 needs to have a frequency band equal to or higher than the repetition frequency $f_s$ of the sampling light $LT_S$. This is due to the fact that each pulse of the cross-correlated light $LT_{CC}$ needs to be photoelectrically converted separately in such a way as to cause no interference with its adjoining pulses in order to display correctly an eye pattern shown by the waveform d in FIG. 14 in the display device 268. However, for example, even if the repetition frequency $f_0$ of the target light $LT_0$ is 100 GHz, the repetition frequency $f_S$ of the sampling light $LT_S$ can be lowered to approximately 100 MHz by setting the dividing factor N as 1000 in the sampling light source 263. Thus, it is sufficient for the optical detector 266 to have a frequency band of approximately 100 MHz.

The electrical signal processing circuit 267 samples the peak value of the pulsed electrical signal $S_{CC}$ outputted by the detector 266 in synchronization with the repetition (i.e., sampling) frequency $f_s$ of the sampling light $LT_S$. Thus, the circuit 267 generates an electrical peak signal $S_{CCP}$ that represents the peak values of the electrical signal $S_{CC}$ and supplies the same to the display device 268. In FIG. 14, the peak values of the electrical signal $S_{CC}$ are shown by circular dots or spots in the vicinity of the waveform c.

The display device 268 displays the waveforms so as to be overlapped with each other on its screen at a period of $[1/(N \cdot \Delta f)]$ on the basis of the electrical peak signal $S_{CCP}$ outputted by the signal processing circuit 267. Thus the device 268 displays the eye pattern as shown by the waveform d.

The measuring person or tester evaluates the characteristics of the optical transmission system according to the opening level of the eye pattern displayed on the screen of the display device 263.

As explained above, with the prior-art measured apparatus 200 shown in FIG. 1, to synchronize the phase of the sampling light $LT_S$ with the phase of the target light $LT_0$, the driving signal oscillator 271 provided in the external apparatus 261 is electrically connected to the driving signal oscillator 262 provided near the sampling light source 263. However, for example, when the ultra-high speed pulses of the target light $LT_0$ having a repetition frequency that exceeds 40 Gb/s, which has been emitted in the external apparatus 261 and transmitted therefrom by way of an optical transmission path (e.g., optical fibers) of several kilometers in length, is measured in real time, it is not realistic to electrically interconnect the oscillator 262 with the oscillator 271 by way of cable of several kilometers in length. This is due to the following reason.

It is known that any ultra-high speed electrical signal is unable to be transmitted over a very long distance by way of cable due to attenuation of the electrical signal. Taking this problem into consideration, the initial electrical signal is converted to an optical signal, the optical signal thus converted is transmitted through an optical transmission path, and then, the optical signal thus transmitted is reconverted to a resultant electrical signal on purpose. From this point of view, it is not meaningless to electrically interconnect the oscillator 262 with the oscillator 271 by way of cable of several kilometers in length. This means that this is not realistic for practical use.

Thus, with the prior-art apparatus 200, because of the necessity to electrically interconnect the two oscillators 271 and 262 with each other, it is unable to substantially synchronize the phase of the target light $LT_0$ with the phase of the sampling light $LT_S$ if the oscillators 271 and 262 are located far away from each other. As a result, there is a problem that the fluctuation of the time difference $\delta t$ (i.e., the mutual jitter) is not decreased, thereby degrading the time resolution.

Additionally, an apparatus and method for measuring the waveform of target light are disclosed in the Japanese Non-Examined Patent Publication No. 9-138165 published in 1997, in which sampling light with the repetition frequency that follows the fluctuation of repetition frequency of the target light is generated. In this apparatus and method, the nonlinear optical effects between the target light and the sampling light are used to measure the waveform of the target light and to control the repetition frequency of the sampling light.

However, these apparatus and method of the Publication No. 9-138165 does not refer to the problem of the degradation of the time resolution in measurement.

SUMMARY OF THE INVENTION

Accordingly, an object of the present invention is to provide a method and an apparatus for measuring she waveform of light that make it possible to synchronize easily the phase of sampling light with the phase of target light even if the target light is in the form of ultra-high speed pulses (e.g., 40 Gb/s or higher in repetition frequency) and is transmitted by way of a long transmission path (e.g., several kilometers in length).

Another object of the present invention is to provide a method and an apparatus for measuring the waveform of light that make it possible to measure the waveform of target light with sufficient time resolution in real time even if the target light is in the form of ultra-high speed pulses (e.g., 40 Gb/s or higher in repetition frequency) and is transmitted by way of a long transmission path (e.g., several kilometers in length).

The above objects together with others not specifically mentioned will become clear to those skilled in the art from the following description.

According to a first aspect of the present invention, a method of measuring a pulse waveform of target light is provided, which comprises the steps of:

(a) generating sampling light having a pulse width narrower than that of target light from the target light;

a repetition frequency of the sampling light having a constant difference with respect to a repetition frequency of the target light;

(b) supplying the sampling light and the target fight to a nonlinear optical member to generate cross-correlated light between the sampling light and the target light; and (c) measuring a waveform of the target light based on the cross-correlated light.

With the method according to the first aspect of the present invention, in the step (a), the sampling light having a pulse width narrower than that of the target light is generated from the target light. In the step (b), the sampling light and the target light are supplied to the nonlinear optical member to generate the cross-correlated light between the sampling light and the target light. In the step (c), the waveform of the target light is measured based on the cross-correlated light. Moreover, the repetition frequency of the sampling light has the constant difference with respect to the repetition frequency of the target light.

As a result, the phase of the sampling light can be easily synchronized with the phase of the target light even if the target light is ultra-high speed pulsed light and is transmitted by way of a long transmission channel. Thus, the waveform of the target light can be measured with sufficient time resolution in real time.

In a preferred embodiment of the method according to the first aspect, the step (a) of generating the sampling light comprises the substeps of:
(a-1) extracting clock light from the target light;
the clock light being synchronized with the target light;
(a-2) generating an electrical clock signal from the clock light;
(a-3) generating an electrical driving signal in such a way that a constant frequency difference exists between a frequency of the electrical driving signal and a frequency of the electrical clock signal; and
(a-4) generating the sampling light based on the electrical driving signal.

In another preferred embodiment of the method according to the first aspect, in the substep (a-1) of extracting the clock light from the target light, the target light is supplied to a passive mode-locked laser, thereby generating the clock light. The clock light has a repetition frequency (1/N) times as much as a repetition frequency of the target light, where N is a natural number.

It is preferred in this preferred embodiment that a passive mode-locked semiconductor laser is used as the passive mode-locked laser.

In this preferred embodiment of the method according to the first aspect, in the substep (a-3) of generating the electrical driving signal,
an electrical offset signal is generated by frequency-dividing the clock signal;
an electrical difference-frequency signal is generated by frequency-mixing the electrical offset signal and the electrical difference-frequency signal together; and
the electrical driving signal is generated based on a phase difference between the electrical offset signal and the electrical difference-frequency signal.

Preferably, there may be additionally provided with the steps of:
(d) generating an electrical cross-correlated signal from the cross-correlated light;
(e) sampling peak values of the electrical cross-correlated signal; and
(f) displaying an eye pattern corresponding to the electrical cross-correlated signal on a screen of a display device by repeatedly writing waveforms of the electrical cross-correlated signal while the electrical offset signal is used as a trigger.

Preferably, the step (e) of sampling the peak values of the electrical cross-correlated signal is performed to be synchronized with an electrical signal generated by frequency-dividing the electrical driving signal.

In still another preferred embodiment of the method according to the first aspect, in the substep (a-3) of generating the electrical driving signal,
an electrical offset signal is generated by frequency-dividing the clock signal;
an electrical difference-frequency signal is generated by frequency-mixing the electrical offset signal and the electrical clock signal together; and
the electrical driving signal is generated based on a phase difference between the electrical driving signal and the electrical difference-frequency signal.

Preferably, there are additionally provided with the steps of:
(d) generating an electrical cross-correlated signal from the cross-correlated light;
(e) sampling peak values of the electrical cross-correlated signal; and
(f) displaying an eye pattern corresponding to the electrical cross-correlated signal on a screen of a display device by repeatedly writing waveforms of the electrical cross-correlated signal while the electrical offset signal is used as a trigger.

The step (e) of sampling the peak values of the electrical cross-correlated signal is preferably performed to be synchronized with an electrical signal generated by frequency-dividing the electrical driving signal.

In a further preferred embodiment of the method according to the first aspect, in the substep (a-3) of generating the electrical driving signal,
an electrical offset signal is generated by frequency-dividing the clock signal;
an electrical, additional driving signal is generated by frequency-dividing the electrical driving signal; and
the electrical driving signal is generated based on a phase difference between the electrical offset signal and the electrical, additional driving signal.

In this embodiment, preferably, there are additionally provided with the steps of:
(d) generating an electrical cross-correlated signal from the cross-correlated light;
(e) sampling peak values of the electrical cross-correlated signal; and
(f) displaying an eye pattern corresponding to the electrical cross-correlated signal on a screen of a display device by repeatedly writing waveforms of the electrical cross-correlated signal while the electrical offset signal is used as a trigger.

Preferably, the step (e) of sampling the peak values of the electrical cross-correlated signal is performed to be synchronized with an electrical signal generated by frequency-dividing the electrical driving signal.

According to a second aspect of the present invention, an apparatus for measuring a pulse waveform of target light is provided, which comprises:
(a) a sampling light generator for generating sampling light having a pulse width narrower than that of target light from the target light;
a repetition frequency of the sampling light having a constant difference with respect to a repetition frequency of the target light;
(b) a cross-correlated light generator for generating a cross-correlated light between the sampling light and the target light by supplying the sampling light and the target light to a nonlinear optical member; and
(c) a measuring device for measuring a waveform of the target light based on the cross-correlated light.

With the apparatus according to the second aspect of the present invention, because of the same reason as explained in the method according to the first aspect, the phase of the sampling light can be easily synchronized with the phase of the target light even if the target light is ultra-high speed pulsed light and is transmitted by way of a long transmission path. Thus, the waveform of the target light can be measured with sufficient time resolution in real time.

In a preferred embodiment of the apparatus according to the second aspect, the sampling light generator (a) comprises:

(a-1) a clock light extractor for extracting clock light from the target light;

the clock light being synchronized with the target light;

(a-2) an electrical clock signal generator for generating an electrical clock signal from the clock light;

(a-3) an electrical driving signal generator for generating an electrical driving signal in such a way that a constant frequency difference exists between a frequency of the electrical driving signal and a frequency of the electrical clock signal; and (a-4) a sampling light generator for generating the sampling light based on the electrical driving signal.

In this embodiment, preferably, the clock light extractor (a-1) comprises a passive mode-locked laser;

the target light being supplied to the passive mode-locked laser, thereby generating the clock light;

the clock light having a repetition frequency (1/N) times as much as a repetition frequency of the target light, where N is a natural number.

A passive mode-locked semiconductor laser is preferably used as the passive mode-locked laser.

In another preferred embodiment of the apparatus according to the second aspect, the electrical driving signal generator (a-3) comprises:

an electrical offset signal generator for generating an electrical offset signal by frequency-dividing the clock signal; and an electrical difference-frequency signal generator for generating an electrical difference-frequency signal by frequency-mixing the electrical offset signal and the electrical difference-frequency signal together;

wherein the electrical driving signal is generated based on a phase difference between the electrical offset signal and electrical difference-frequency signal.

In this embodiment, preferably, there are additionally provided with (d) an electrical cross-correlated signal generator for generating an electrical cross-correlated signal from the cross-correlated light;

(e) a peak value sampler for sampling peak values of the electrical cross-correlated signal; and (f) a display device for displaying an eye pattern corresponding to the electrical cross-correlated signal on a screen of a display device by repeatedly writing waveforms of the electrical cross-correlated signal while the electrical offset signal is used as a trigger.

Preferably, the peak value sampler (e) samples the peak values of the electrical cross-correlated signal to be synchronized with an electrical signal generated by frequency-dividing the electrical driving signal.

In still another preferred embodiment of the apparatus according to the second aspect, in the electrical driving signal generator (a-3);

an electrical offset signal 4 is generated by frequency-dividing the clock signal;

an electrical difference-frequency signal is generated by frequency-mixing the electrical offset signal and the electrical clock signal together; and the electrical driving signal is generated based on a phase difference between the electrical driving signal and electrical difference-frequency signal.

In this embodiment, preferably, there are additionally provided with (d) an electrical cross-correlated signal generator for generating an electrical cross-correlated signal from the cross-correlated light;

(e) a peak value sampler for sampling peak values of the electrical cross-correlated signal; and (f) a display device for displaying an eye pattern corresponding to the electrical cross-correlated signal on a screen of a display device by repeatedly writing waveforms of the electrical cross-correlated signal while the electrical offset signal is used as a trigger.

Preferably, the peak value sampler operates to be synchronized with an electrical signal generated by frequency-dividing the electrical driving signal.

In a further preferred embodiment of the apparatus according to the second aspect, in the electrical driving signal generator (a-3);

an electrical offset signal is generated by frequency-dividing the clock signal;

an electrical, additional driving signal is generated by frequency-dividing the electrical driving signal; and the electrical driving signal is generated based on a phase difference between the electrical offset signal and the electrical, additional driving signal.

In this embodiment, preferably, there are additionally provided with (d) an electrical cross-correlated signal generator for generating an electrical cross-correlated signal from the cross-correlated light;

(e) a peak value sampler for sampling peak values of the electrical cross-correlated signal; and (f) a display device for displaying an eye pattern corresponding to the electrical cross-correlated signal on a screen of a display device by repeatedly writing waveforms of the electrical cross-correlated signal while the electrical offset signal is used as a trigger.

Preferably, the peak value sampler operates to be synchronized with an electrical signal generated by frequency-dividing the electrical driving signal.

BRIEF DESCRIPTION OF THE DRAWINGS

In order that the present invention may be readily carried into effect, it will now be described with reference to the accompanying drawings.

FIG. 14 is a waveform diagram showing the waveforms of the target light, the sampling light, the cross-correlated light, and the eye pattern.

DETAILED DESCRIPTION OF THE PREFERRED EMBODIMENTS

Figure 1:
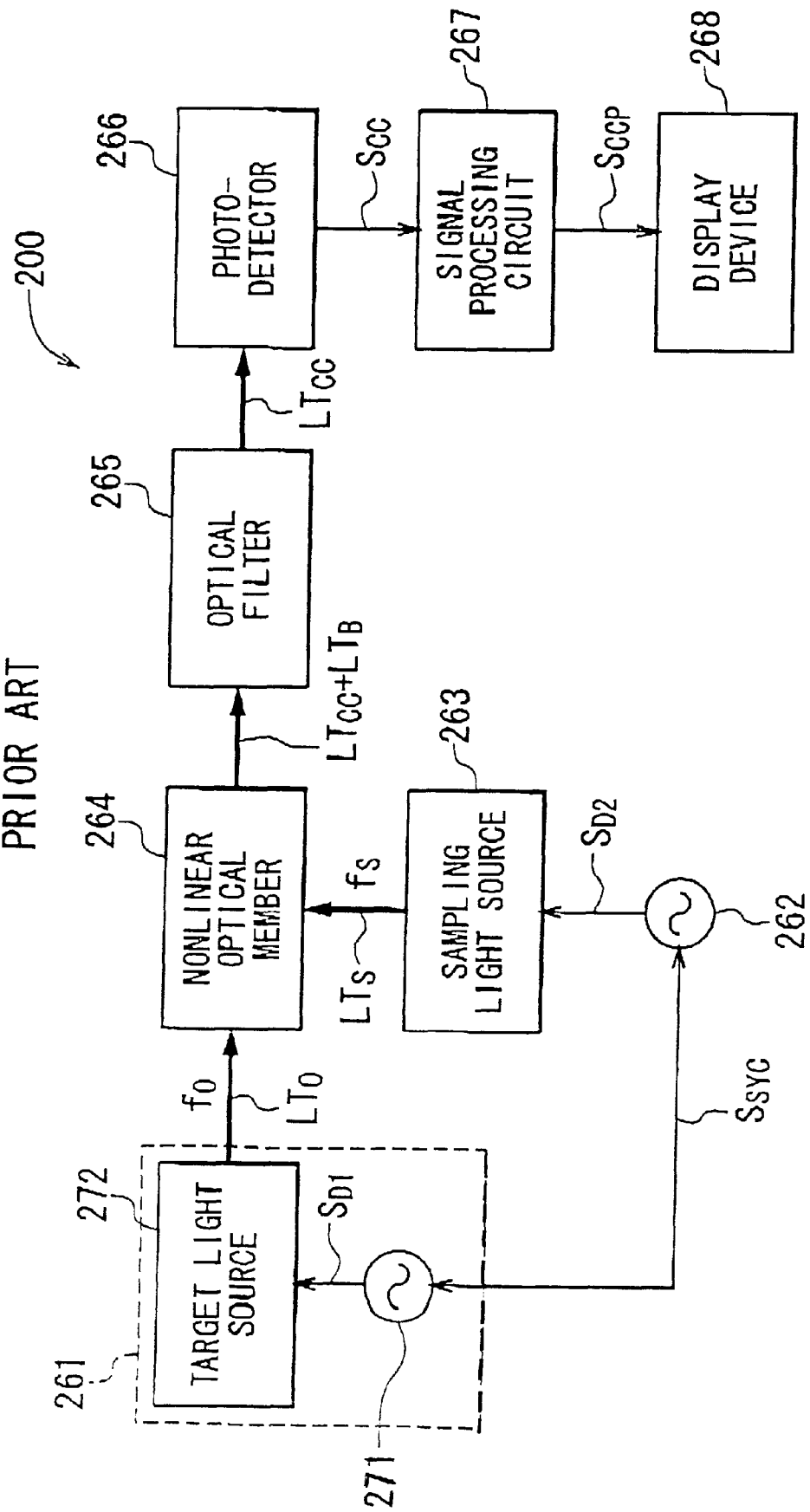
FIG. 1 is a schematic block diagram showing the configuration of a prior-art optical measuring apparatus.

Preferred embodiments of the present invention will be described in detail below while referring to the drawings attached.

First Embodiment

Figure 2:
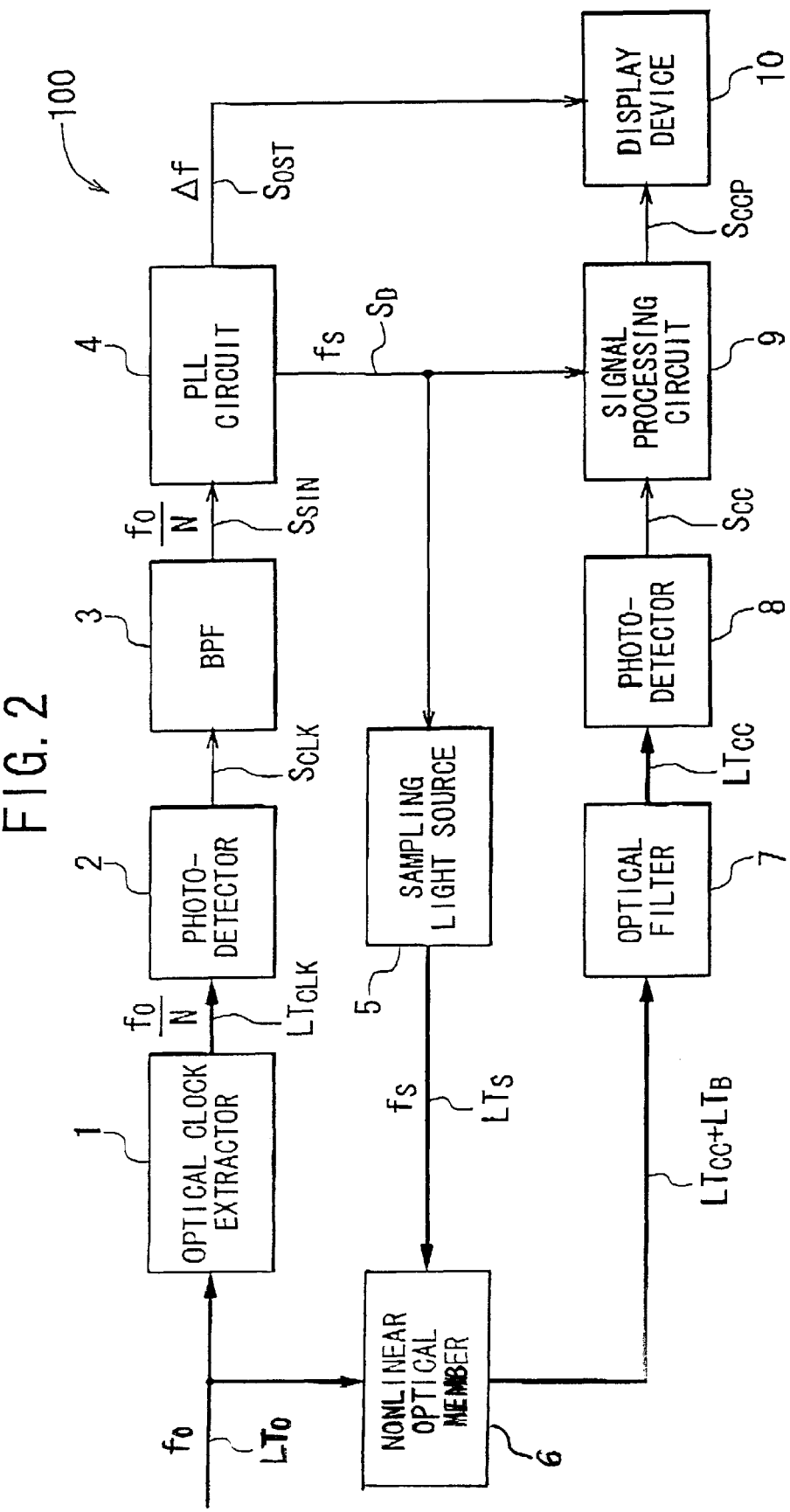
FIG. 2 is a schematic block diagram showing the configuration of an optical measuring apparatus according to a first embodiment of the invention.
Figure 3:
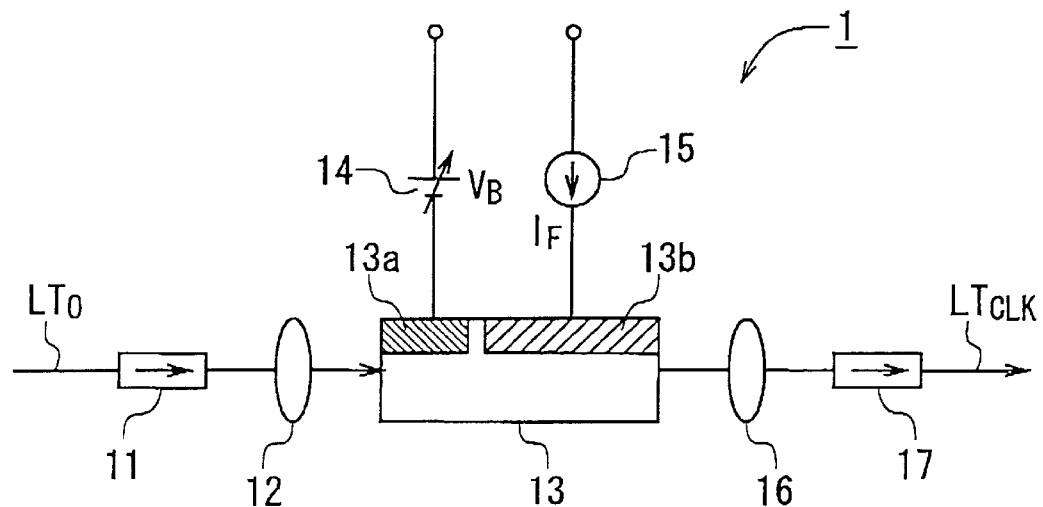
FIG. 3 is a schematic illustration showing the configuration of the optical clock extractor used in the apparatus according to the first embodiment of FIG. 2.
Figure 4:
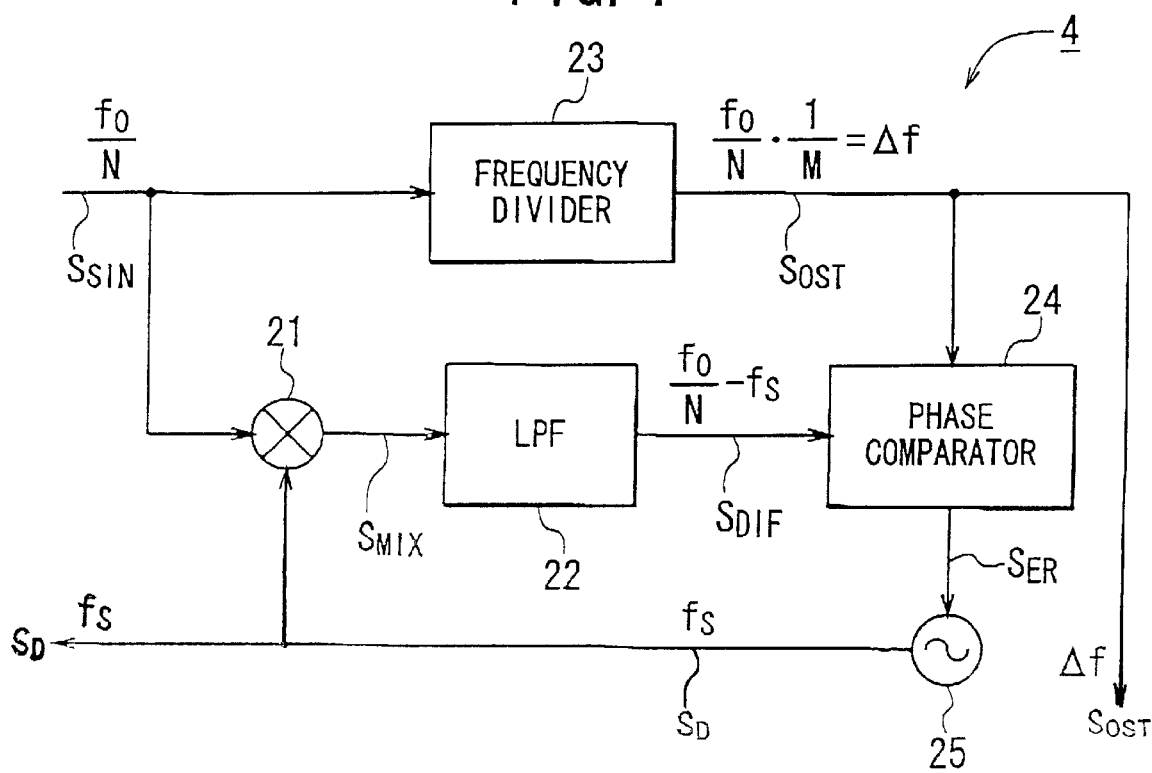
FIG. 4 is a schematic block diagram showing the configuration of the PLL circuit used in the apparatus according to the first embodiment of FIG. 2.

An apparatus for measuring optically the waveform of sampling light according to a first embodiment of the invention has the structure shown in FIGS. 2, 3, and 4, in which thick lines indicate the flow of optical signals while thin lines indicate the flow of electrical signals The optical measuring apparatus 100 according to the first embodiment of the invention comprises an optical clock extractor 1, a photodetector 2, a band-pass filter (BPF) 3, a phase-locked loop (PLL) circuit 4, a sampling light source 5, a nonlinear optical member 6, an optical filter 7, a photodetector 8, an electrical signal processing circuit 9, and a display device 10.

The optical clock extractor 1 receives part of pulsed target light $LT_0$ with a repetition frequency of $f_0$, the target light $LT_0$ has been transmitted from an external apparatus (not shown) by way of a long-distance optical path (e.g., optical fibers). The extractor 1 generates clock light $LT_{CLK}$ with a repetition frequency of $(f_0/N)$ synchronized with the target light $LT_0$ thus received. The clock light $LT_{CLK}$ is then applied to the photodetector 2.

An example of the configuration of the optical clock extractor 1 is shown in FIG. 3. In this configuration, the extractor 1 comprises an optical isolator 11, a lens 12, a passive mode-locked semiconductor laser 13, a biasing voltage source 14, a direct current (DC) current source 15, a lens 16, and an optical isolator 17.

With the laser 13, it is supposed that the resonator length is L, the refractive index containing the group velocity dispersion is n, the repetition frequency in the passive mode-locked operation is $f_M$, and the velocity of light in vacuum is c. In this case, the repetition frequency $f_M$ is expressed by the following equation (2).

$$f_M \cong \frac{c}{2nL} \quad (2)$$

To cause the laser 13 to perform the passive mode-locked operation, the resonator length L is adjusted to satisfy the following equation (3), where N is a natural number (i.e., N=1, 2, 3, 4, . . . ). At the same time as this, a reverse bias voltage $V_B$ is applied to the suturable absorption region 13a of the laser 13 by the voltage source 14 and a forward DC current $I_f$ is supplied to the gain region 13b of the laser 13 by the current source 15.

$$f_M \cong \frac{f_0}{N} \quad (3)$$

When the target light $LT_0$ with the repetition frequency $f_0$ is applied to the laser 13 in the passive mode-locked operation by way of the isolator 11 and the lens 12, the light $LT_0$ is modulated in the suturable absorption region 13a of the laser 13, thereby converting the repetition frequency $f_0$ to the repetition frequency $(f_0/N)$. Thus, the clock light $LT_{CLK}$ with the repetition frequency $(f_0/N)$, which is synchronized with the target light $LT_0$, is generated in the laser 13. The clock light $LT_{CLK}$ thus generated in the laser 13 is emitted from the extractor 1 by way of the lens 16 and the isolator 17.

The possible increase of jitter in the clock light $LT_{CLK}$ in the extractor 1 can be limited to the order of femtoseconds (fs) by suitably adjusting the operation condition of the extractor 1. Thus, the increase of jitter can be ignored in the measurement.

Referring to FIG. 2, the photodetector 2 receives the clock light $LT_{CLK}$ emitted from the optical clock extractor 1 and photo electrically converts the light $LT_{CLK}$ thus received to an electrical clock signal $S_{CLK}$. The clock signal $S_{CLK}$ is then sent to the BPF 3.

The BPF 3 has a characteristic that allows only the electrical signals with the frequency in the vicinity of $(f_0/N)$ to pass through the same. Thus, only the electrical clock signal $S_{CLK}$ with the frequency $(f_0/N)$ passes through the BPF 3, resulting in an electrical sinusoidal signal $S_{SIN}$ with the frequency $(f_0/N)$. The signal $S_{SIN}$ is then sent to the PLL circuit 4.

The PLL circuit 4 receives the electrical sinusoidal signal $S_{SIN}$ with the frequency $(f_0/N)$ and generates an electrical driving signal $S_D$ and an electrical offset signal $S_{OST}$. The driving signal $S_D$ has a frequency $f_S$, which is different from the frequency $(f_0/N)$ of the sinusoidal signal $S_{SIN}$ by a constant frequency difference $\Delta f$. The offset signal $S_{OST}$ has a frequency equal to the frequency difference $\Delta f$. The circuit 4 sends the driving signal $S_D$ and the offset signal $S_{OST}$ to the signal processing circuit 9 and the display device 10, respectively.

An example of the configuration of the PLL circuit 4 is shown in FIG. 4, which comprises a frequency mixer 21, a low-pass filter (LPF) 22, a frequency divider 23, a phase comparator 24, and a voltage-controlled oscillator (VCO) 25.

The frequency mixer 21 receives the sinusoidal signal $S_{SIN}$ with the frequency $(f_0/N)$ supplied from the BPF 3 and the driving signal $S_D$ with the frequency $f_S$ $[=(f_0/N)-\Delta f]$ supplied from the VCO 25 and then, frequency-mixes them together. Thus, the mixer 21 generates an electrical mix signal $S_{MIX}$ and outputs the same. The mix signal $S_{MIX}$ contains a difference-frequency component with a difference-frequency of $[(f_0/N)-f_S]$ and a sum-frequency component with a sum-frequency of $[(f_0/N)+f_S]$ and their harmonics.

The LPF 22 allows only the difference-frequency component with the difference-frequency $[(f_0/N)-f_S]$ and therefore, it outputs the same component as a difference-frequency signal $S_{DIF}$ with the difference-frequency $[(f_0/N)-f_S]$ to the phase comparator 24.

The frequency divider 23 receives the sinusoidal signal $S_{SIN}$ with the frequency $(f_0/N)$ supplied from the BPF 3 and then, frequency-divides the signal $S_{SIN}$ by a dividing factor M, where M is a natural number (i.e., M=1, 2, 3, 4, ...). Thus, the divider 23 outputs the electrical offset signal $S_{OST}$ with the frequency $\Delta f$ to the phase comparator 24 and the display device 10, where $\Delta f$ satisfies the relationship of $\Delta f=[f_0/(N\cdot M)]$.

The frequency divider 23 is, for example, formed by a digital logic circuit such as an emitter-coupled logic (ECL) capable of ultra-high-speed operation. In this case, the rise time of the offset signal $S_{OST}$ is sufficiently short and the fluctuation thereof is sufficiently small. Thus, there is an advantage that the eye pattern is displayed clearly in the display device 10, raising the time resolution in the measuring apparatus 100 according to the first embodiment of FIG. 2.

The phase comparator 24 compares the phase of the difference-frequency signal $S_{DIF}$ with the difference-frequency $[(f_0/N)-f_S]$ and that of the offset signal $S_{OST}$ with the frequency $\Delta f$, outputting an error signal $S_{ER}$ to the VCO 25. The error signal $S_{ER}$ thus outputted is proportional to the phase difference between these two signals $S_{DIF}$ and $S_{OST}$.

The VCO 25 generates the electrical driving signal $S_D$ whose frequency is kept at $f_S$ according to the voltage (i.e., amplitude) of the error signal $S_{ER}$ from the phase comparator 24, where $f_S=(f_0/N)-\Delta f$. Then, the VCO 25 outputs the driving signal $S_D$ to the frequency mixer 21, the signal processing circuit 9 and the sampling light source 5.

Here, the explanation is returned to the apparatus 100 itself again. As shown in FIG. 2, the sampling light source 5 emits the sampling light $LT_S$ in the form of narrow pulses according to the electrical driving signal $S_D$ supplied from the PLL circuit 4. The sampling light $LT_S$ has a repetition frequency $f_S[=(f_0/N)-\Delta f]$. This means that the repetition frequency $f_S$ of the sampling light $LT_S$ is different from the frequency $(f_0/N)$ of the clock light $LT_{CLK}$ by $\Delta f$, where $f_0$ is the repetition frequency of the target light $LT_0$.

As the sampling light source 5, for example, any mode-locked laser with the Fabry-Perot resonator (e.g., a mode-locked semiconductor laser), any mode-locked laser with the ring resonator (e.g., an optical fiber laser), or any gain-switching semiconductor laser may be used. The details of the lasers of this type are, for example, disclosed in the above-referred Japanese Non-Examined Patent Publication Nos. 8-29814 and 9-160082.

The nonlinear optical member 6 is made of a ferroelectric crystal such as KTP that causes a secondary nonlinear optical effect (e.g., SFG), or a semiconductor optical amplifier or a quartz-system optical waveguide such as an optical fiber that causes a tertiary nonlinear optical effect (e.g., FWM). The member 6 emits intensity cross-correlated light $LT_{CC}$ between the pulses of the target light $LT_0$ supplied from the external apparatus and the sampling light $LT_S$ supplied from the sampling light source 5. The intensity cross-correlated light $LT_{CC}$ thus emitted has a repetition frequency of $f_S$, which is equal to the frequency of the electrical driving signal $S_D$.

Background light $LT_B$ is emitted from the optical member 6 along with the cross-correlated light $LT_{CC}$. The background light $LT_B$ contains the target light $LT_0$ and the sampling light $LT_S$ and their secondary or higher harmonics.

Here, the optical frequencies of the target light $LT_0$ and the sampling light $LT_S$ are defined as $\nu_{sig}$ and $\nu_{smp}$, respectively. In this case, if the optical member 6 is made of a material causing a secondary nonlinear optical effect, sum-frequency light with the optical frequency $\nu_{sum}$ given by the following equation (4) or difference-frequency light with the optical frequency $\nu_{dif}$ given by the following equation (5) is generated in the member 6. The sum-frequency or difference-frequency light thus generated is outputted from the member 6 as the cross-correlated light $LT_{CC}$.

$$\nu_{sum}=\nu_{sig}+\nu_{smp} \qquad (4)$$

$$\nu_{dif}=|\nu_{sig}-\nu_{smp}| \qquad (5)$$

On the other hand, if the optical member 6 is made of a material causing a tertiary nonlinear optical effect, four-wave mixed light with the optical frequency $\nu_{fwm}$ given by the following equation (6) is generated in the member 6. The four-wave mixed light thus generated is outputted from the member 6 as the cross-correlated light $LT_{CC}$.

$$\nu_{fwm}=2\nu_{smp}-\nu_{sig} \qquad (6)$$

The optical filter 7 removes the background light $LT_B$ of the cross-correlated light $LT_{CC}$ emitted from the optical member 6, allowing only the cross-correlated light $LT_{CC}$ to pass through the same. The cross-correlated light $LT_{CC}$ is then sent to the photodetector 8.

The photodetector 8 converts photoelectrically the cross-correlated light $LT_{CC}$ to an electrical pulsed signal $S_{CC}$ and then, sends the signal $S_{CC}$ thus generated to the signal processing circuit 9. As described previously in the explanation about the prior-art apparatus 200, the photodetector 8 needs to have a frequency band equal to or higher than the repetition frequency $f_S$ the sampling light $LT_S$.

The signal processing circuit 9 samples or extracts the peak values of the electrical pulsed signal $S_{CC}$ supplied from the photodetector 8. The sampling operation of the circuit 9 is conducted to be synchronized with the driving signal $S_D$ with the repetition frequency $f_S$ equal to the sampling frequency of the sampling light $LT_S$. The peak values thus extracted are plotted with the circular dots in FIG. 14 in the vicinity of the waveform c. The circuit 9 generates an electrical peak signal $S_{CCP}$ corresponding to the extracted peak values of the signal $S_{CC}$, supplying the peak signal $S_{CCP}$ to the display device 10.

The display device 10 displays an eye pattern as shown by the waveform d in FIG. 14 on its screen (not shown) by repeatedly writing a plurality of waveforms on the same plane at a specific period of $[1/(N\cdot\Delta f)]$ on the basis of the peak signal $S_{CCP}$ supplied from the signal processing circuit 9. The displaying operation of the device 10 is carried out while the offset signal $S_{OST}$ with the frequency $\Delta f$ supplied by the PLL circuit 4 is used as a trigger signal.

Next, the operation of the measuring apparatus 100 according to the first embodiment having he above-described configuration is explained below.

First, the optical clock extractor 1 receives the pulsed target light $LT_0$ with the repetition frequency $f_0$ and emits the pulsed clock light $LT_{CLK}$ with the repetition frequency $(f_0/N)$ synchronized with the target light $LT_0$ thus received. The target light $LT_0$ has the waveform a shown in FIG. 14. The waveform of the clock light $LT_{CLK}$ is not shown in FIG.

14; however, the waveform of the clock light $LT_{CLK}$ is approximately the same as the waveform b of the sampling light $LT_S$ shown in FIG. 14. The repetition frequency ($f_0/N$) of the clock light $LT_{CLK}$ is different from that of the sampling light $LT_S$ by $\Delta f$.

The clock light $LT_{CLK}$ thus emitted from the extractor 1 is photoelectrically converted to the electrical clock signal $S_{CLK}$ by the photodetector 2. Only the electrical clock signal $S_{CLK}$ with the frequency ($f_0/N$) can pass through the BPF 3 and as a result, the electrical sinusoidal signal $S_{SIN}$ with the frequency of ($f_0/N$) is outputted from the BPF 3 and supplied to the PLL circuit 4.

In the PLL circuit 4, as shown in FIG. 4, the sinusoidal signal $S_{SIN}$ with the frequency ($f_0/N$) is frequency-divided by the dividing factor M by the frequency divider 23, generating the electrical offset signal $S_{OST}$ with the frequency $\Delta f$. The offset signal $S_{OST}$ is then supplied to the phase comparator 24 and at the same time, is supplied to the display device 10 as the trigger signal.

On the other hand, the sinusoidal signal $S_{SIN}$ with the frequency ($f_0/N$) is supplied to the frequency mixer 21 also. In the mixer 21, the sinusoidal signal $S_{SIN}$ is mixed with the driving signal $S_D$ with the frequency $f_S$ supplied by the VCO 25. Thus, the electrical mix signal $S_{MIX}$ is generated. Only the difference-frequency component with the difference-frequency of $[(f_0/N)-f_S]$ of the mix signal $S_{MIX}$ is selectively outputted by the LPF 22 as the difference-frequency signal $S_{DIF}$ with the difference-frequency $[(f_0/N)-f_S]$.

The difference-frequency signal $S_{DIF}$ and the offset signal $S_{OST}$ are sent to the phase comparator 24 and compared in phase with each other. Thus, the error signal $S_{ER}$ proportional to the phase difference between these two signals $S_{DIF}$ and $S_{OST}$ is outputted from the comparator 24. The error signal $S_{ER}$ thus outputted is then supplied to the VCO 25.

In the VCO 25, the driving signal $S_D$ whose frequency is kept at $f_S$ according to the voltage of the error signal $S_{ER}$ is generated, where $f_S=(f_0/N)-\Delta f$. Then, the driving signal $S_D$ thus generated is hen sent to the frequency mixer 21, the signal processing circuit 9, and the sampling light source 5.

The electrical offset signal $S_{OST}$ (frequency: $\Delta f=f_0/(N \cdot M)$) outputted from the PLL circuit 4 is generated by frequency-dividing the electrical sinusoidal signal $S_{SIN}$ (frequency: $f_0/N$) generated from the clock light $LT_{CLK}$ (repetition frequency: $f_0/N$), where the clock light $LT_{CLK}$ is synchronized with the target light $LT_0$ (repetition frequency: $f_0$). Therefore, the offset signal $S_{OST}$ is synchronized with the target light $LT_0$. In this case, if the frequency of the driving signal $S_D$ outputted from the VCO 25 is kept at $f_S$, the phase of the driving signal $S_D$ is always synchronized with the phase of the target light $LT_0$.

The driving signal $S_D$ thus generated is supplied to the sampling light source 5. On the other hand, as explained previously, the driving signal $S_D$ has the frequency $f_S$ and the phase synchronized with the phase of the target light $LT_0$. Accordingly, the sampling light $LT_S$ emitted from the light source 5 is in the form of narrow pulses with the repetition frequency $f_S$, as shown by the waveform b in FIG. 14.

The sampling light $LT_S$ thus emitted from the source 5 is supplied to the nonlinear optical member 6 while the target light $LT_0$ is supplied to the same member 6 as well. Thus, the cross-correlated light $LT_{CC}$ between the sampling light $LT_S$ and the target light $LT_0$ is emitted from the member 6 along with the background light $LT_B$. The cross-correlated light $LT_{CC}$ has the waveform c shown in FIG. 14. The cross-correlated light $LT_{CC}$ and the background light $LT_B$ enter the optical filter 7. Only the cross-correlated light $LT_{CC}$ passes through the filter 7 and enters the photodetector 8. In the photodetector 8, the cross-correlated light $LT_{CC}$ is photo-electrically converted to the electrical pulsed signal $S_{CC}$ and then, it is emitted from photodetector 8.

The electrical signal $S_{CC}$ from the photodetector 8 is subjected to the specific signal processing operation in the electrical signal processing circuit 9. Then, the peak values (i.e., the circular dots in FIG. 14) of the electrical signal $S_{CC}$ are sampled and then, supplied to the display device 10 as the electrical peak signal $S_{CCP}$.

In the display device 10, an eye pattern is displayed on the screen as shown by the waveform d in FIG. 14. This is realized by repeatedly writing a plurality of waveforms on the same plane at a specific period of $[1/(N \cdot \Delta f)]$ on the basis of the peak signal $S_{CCP}$ supplied from the signal processing circuit 9. The offset signal $S_{OST}$ with the frequency $\Delta f$ supplied by the PLL circuit 4 is used as a trigger signal in the device 10.

A measuring person or tester evaluates the characteristics of a target optical transmission system to be evaluated according to the opening level of the eye pattern d displayed on the screen of the display device 10.

With the optical measuring device 100 according to the first embodiment, as explained in detail, the electrical driving signal $S_D$ (frequency: $f_S$) synchronized in phase with the target light $LT_0$ (repetition frequency: $f_0$) is generated from the target light $LT_0$ itself in the PLL circuit 4. Also, the sampling light $LT_S$ (repetition frequency: $f_S$) is generated in the sampling light source 5 on the basis of the electrical driving signal $S_D$ thus generated. Thus, unlike the prior-art apparatus 200 shown in FIG. 1, the electrical connection between the driving signal oscillator 262 and the driving signal oscillator 271 provided in the external apparatus 261 is unnecessary.

As a result, even when the ultra-high speed pulses of the target light $LT_0$ having a repetition frequency that exceeds 40 Gb/s, which has been transmitted by way of an optical transmission path (which is formed by, e.g., optical fibers) of several kilometers in length, is measured in real time, the target light $LT_0$ and the sampling light $LT_S$ can be synchronized in phase with each other. Accordingly, the fluctuation of the time difference $\delta t$ (i.e., the mutual jitter) can be decreased, which raises the time resolution in measurement.

Second Embodiment

Figure 5:
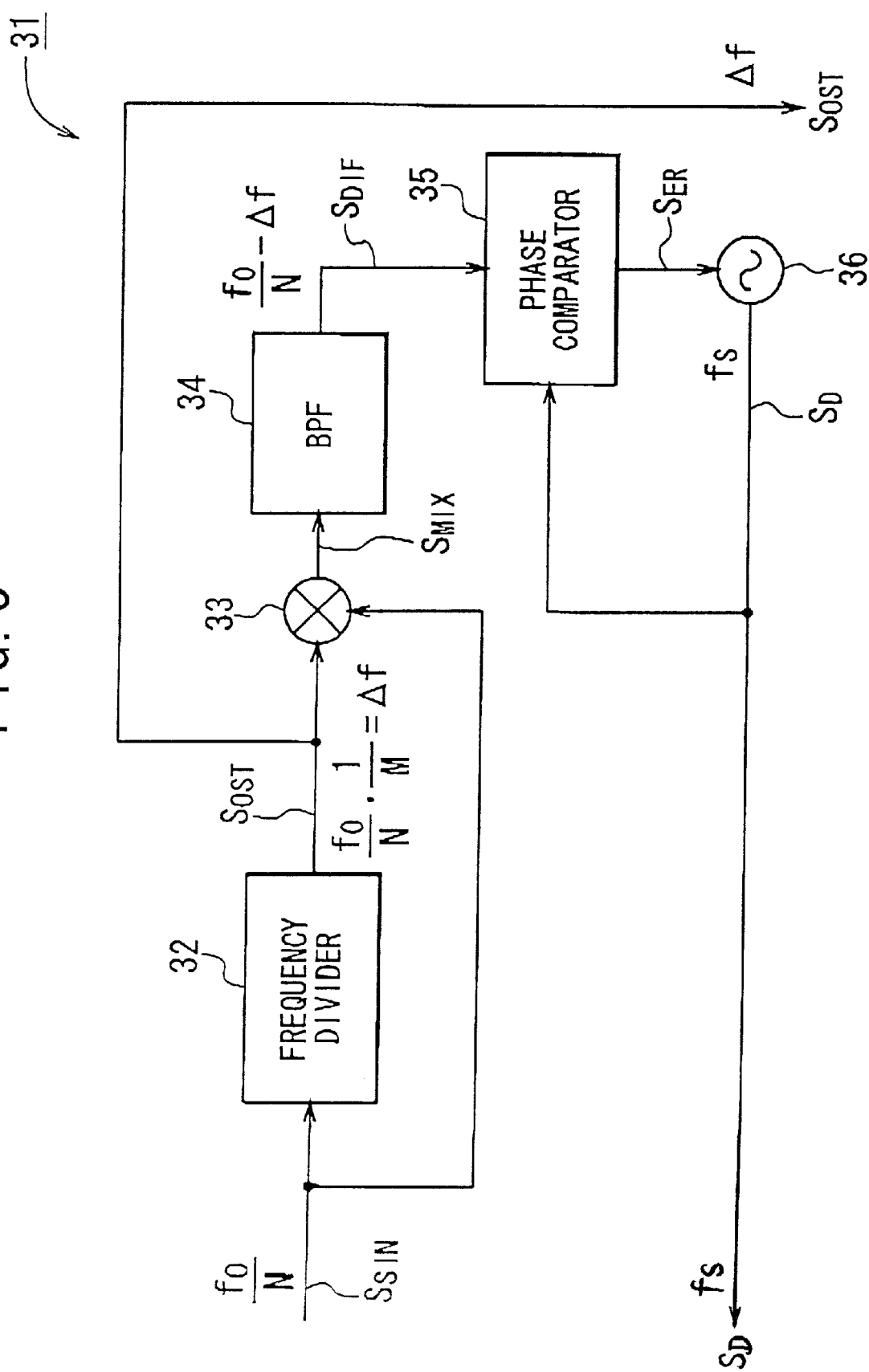
FIG. 5 is a schematic block diagram showing the configuration of an optical measuring apparatus according to a second embodiment of the invention.

FIG. 5 shows a PLL circuit 31 provided in an apparatus for measuring the waveform of sampling light according to a second embodiment of the invention.

The apparatus according to the second embodiment has a configuration obtained by replacing the PLL circuit 4 in the apparatus 100 according to the first embodiment with the a circuit 31. The other configuration of the apparatus of the second embodiment is the same as the apparatus 100 of the first embodiment. Thus the explanation about only the PLL circuit 31 is presented here for the sake of simplification of description.

As shown in FIG. 5, the PLL circuit 31 comprises a frequency divider 32, a frequency mixer 33, a BPF 34, a phase comparator 35, and a VCO 36.

The frequency divider 32 receives the electrical sinusoidal signal $S_{SIN}$ with the frequency ($f_0/N$) supplied from the BPF 3 and then, frequency-divides the signal $S_{SIN}$ by the dividing factor M, where M is a natural number. Thus, the divider 32 outputs the electrical offset signal $S_{OST}$ with the frequency $\Delta f$ to the frequency mixer 33 and the display device 10, where $\Delta f$ satisfies the relationship of $\Delta f=[f_0/(N \cdot M)]$.

The frequency divider 32 is, for example, formed by a digital logic circuit such as ECL capable of ultra-high-speed operation.

The frequency mixer 33 receives the sinusoidal signal $S_{SIN}$ with the frequency ($f_0$/N) supplied from the BPF 3 and the electrical offset signal $S_{OST}$ with the frequency $\Delta f$ supplied from the divider 32 and then, frequency-mixes them together. Thus, the mixer 33 generates the electrical mix signal $S_{MIX}$ and outputs the same to the BPF 34. The mix signal $S_{MIX}$ contains a difference-frequency component with a difference-frequency [($f_0$/N)–$\Delta f$] and a sum-frequency component with a sum-frequency [($f_0$/N)+$\Delta f$] and their harmonics.

The BPF 34 allows only the difference-frequency component with the difference-frequency [($f_0$/N)–$\Delta f$] and outputs the same component as the electrical difference-frequency signal $S_{DIF}$ with the difference-frequency [($f_0$/N)–$\Delta f$] to the phase comparator 35.

The phase comparator 35 compares the phase of the difference-frequency signal $S_{DIF}$ with the difference-frequency [($f_0$/N)–$\Delta f$] and that of the driving signal $S_D$ with the frequency $f_S$ [=($f_0$/N)–$\Delta f$] supplied from the VCO 36. Thus, the comparator 35 outputs an electrical error signal $S_{ER}$ to the VCO 36. The error signal $S_{ER}$ is proportional to the phase difference between these two signals $S_{DIF}$ and $S_D$.

The VCO 36 generates the driving signal $S_D$ whose frequency is kept at $f_S$[=($f_0$/N)–$\Delta f$] according to the voltage (i.e., the amplitude) of the error signal $S_{ER}$ from the phase comparator 35. Then, the VCO 36 outputs the driving signal $S_D$ to the phase comparator 35 and the signal processing circuit 9. Also, the driving signal $S_D$ is fed back to the VCO 36.

Next, the operation of the PLL circuit 31 of FIG. 5 having the above-described configuration is explained below.

In the PLL circuit 31, the electrical sinusoidal signal $S_{SIN}$ with the frequency of ($f_0$/N) is frequency-divided by the dividing factor M by he frequency divider 32, generating the offset signal $S_{OST}$ with the frequency $\Delta f$. The offset signal $S_{OST}$ is supplied to the frequency mixer 33 and the display device 10 as the trigger signal.

On the other hand, the sinusoidal signal $S_{SIN}$ with the frequency of ($f_0$/N) is frequency-mixed with the offset signal $S_{OST}$ with the frequency $\Delta f$ in the frequency mixer 33, thereby outputting the mix signal $S_{MIX}$ to the BPF 34. The BPF 34 allows only the difference-frequency component of the mixer signal $S_{MIX}$ to pass through the same, outputting the component as the difference-frequency signal $S_{DIF}$ with the difference-frequency [($f_0$/N)–$\Delta f$].

In the phase comparator 35, the error signal $S_{ER}$ proportional to the phase difference between the difference signal $S_{DIF}$ and the driving signal $S_D$ is generated and sent to the VCO 36. In the VCO 36, the frequency of the driving signal $S_D$ is kept at $f_S$ according to the voltage of the error signal $S_{ER}$.

With the measuring apparatus according to the second embodiment comprising the PLL circuit 31 in FIG. 5, the electrical offset signal $S_{OST}$ (frequency: $\Delta f = f_0/(N \cdot M)$) outputted from the frequency divider 32 is generated by frequency-dividing the electrical sinusoidal signal $S_{SIN}$ (frequency: $f_0$/N) generated from the clock light $LT_{CLK}$ (repetition frequency: $f_0$/N), where the clock light $LT_{CLK}$ is synchronized with the target light $LT_0$ (repetition frequency: $f_0$) Therefore, the offset signal $S_{OST}$ is synchronized with the target light $LT_0$. In this case, since the frequency of the driving signal $S_D$ outputted from the VCO 36 is kept at $f_S$, the phase of the driving signal $S_D$ is always synchronized with the phase of the target light $LT_0$.

As a result, there are approximately the same advantages as those in the measuring device 100 according to the first embodiment.

Third Embodiment

Figure 6:
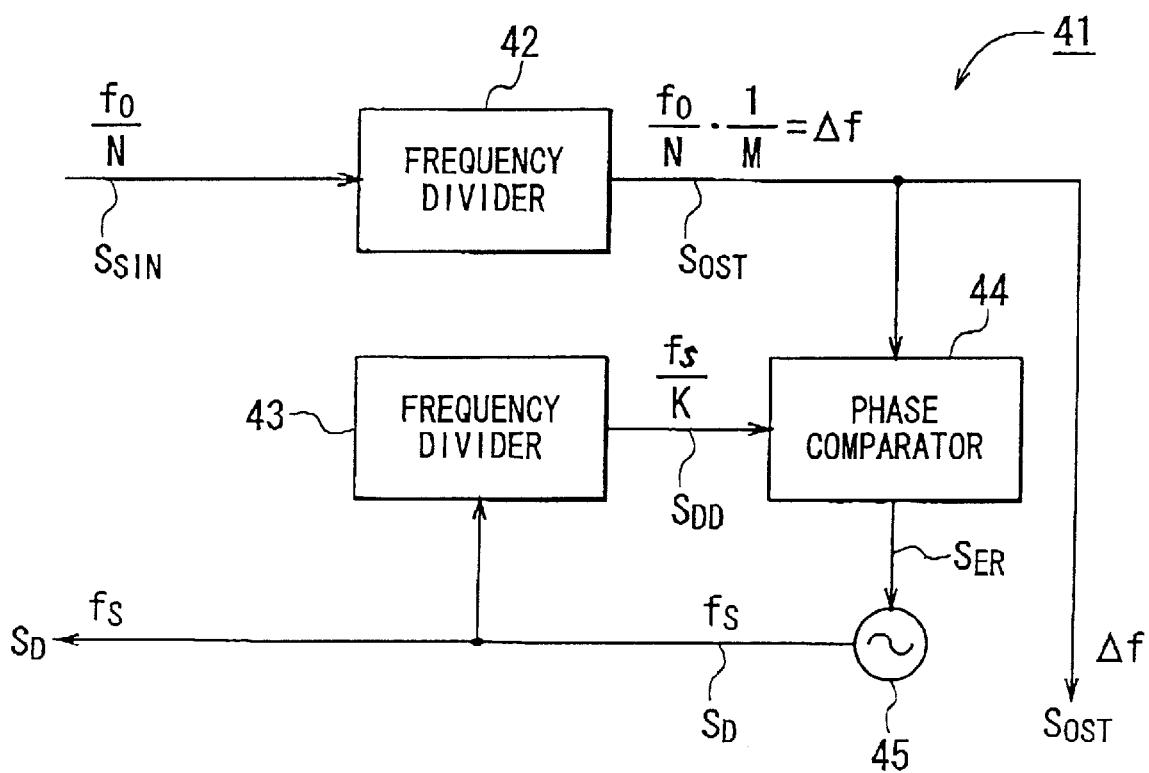
FIG. 6 is a schematic block diagram showing the configuration of an optical measuring apparatus according to a third embodiment of the invention.

FIG. 6 shows a PLL circuit 41 provided in an apparatus for measuring the waveform of sampling light according to a third embodiment of the invention.

The apparatus according to the third embodiment has a configuration obtained by replacing the PLL circuit 4 in the apparatus 100 according to the first embodiment with the PLL circuit 41. The other configuration of the apparatus of the third embodiment is the same as the apparatus 100 of the first embodiment. Thus, the explanation about only the PLL circuit 41 is presented here for the sake of simplification of description.

As shown in FIG. 6, the PLL circuit 41 comprises first and second frequency dividers 42 and 43, a phase comparator 44, and a VCO 45.

The first frequency divider 42 receives the sinusoidal signal $S_{SIN}$ with the frequency ($f_0$/N) supplied from the BPF 3 and the frequency-divides the signal $S_{SIN}$ by a dividing factor M, where M is a natural number. Thus, the divider 42 outputs the electrical offset signal $S_{OST}$ with the frequency $\Delta f$ to the phase comparator 44 and the display device 10, where $\Delta f$ satisfies the relationship of $\Delta f = [f_0/(N \cdot M)]$.

The second frequency divider 43 receives the driving signal $S_D$ with the frequency $f_S$ [=($f_0$/N)–$\Delta f$] supplied from the VCO 45 and then, frequency-divides the signal $S_D$ by a dividing factor K, where K is a natural number (i.e., K=1, 2, 3, 4, . . .). Thus, the divider 43 outputs an electrical second or additional driving signal $S_{DD}$ with the frequency ($f_S$/K) to the phase comparator 44.

The dividing factors M and K are determined in such a way that the frequency $\Delta f$ [=$f_0/(N \cdot M)$] is equal to the frequency ($f_S$/K).

Each of the first and second frequency dividers 42 and 43 is, for example, formed by a digital logic circuit such as ECL capable of ultra-high-speed operation.

The phase comparator 44 compares the phase of the offset signal $S_{OST}$ with the frequency $\Delta f$[=$f_0/(N \cdot M)$] from the first frequency divider 42 and that of the second or additional driving signal $S_{DD}$ with the frequency ($f_S$/K) supplied from the second frequency divider 43. Thus, the comparator 44 outputs an error signal $S_{ER}$ to the VCO 45. The error signal $S_{ER}$ is proportional to the phase difference between these two signals $S_{OST}$ and $S_{DD}$.

The VCO 45 generates the driving signal $S_D$ whose frequency is kept at $f_S$ [=($f_0$/N)–$\Delta f$] according to the voltage of the error signal $S_{ER}$ from the phase comparator 44. Then, the VCO 45 outputs the driving signal $S_D$ thus generated to the frequency divider 43, the signal processing circuit 9, and the sampling light source 5.

Next, the operation of the PLL circuit 41 having the above-described configuration is explained below.

In the PLL circuit 41, the electrical sinusoidal signal $S_{SIN}$ with the frequency of ($f_0$/N) is frequency-divided by the dividing factor M by the first frequency divider 42, generating the offset signal $S_{OST}$ with the frequency $\Delta f$. The offset signal $S_{OST}$ is supplied to the phase comparator 44 and the display device 10 as the trigger signal.

On the other hand, the driving signal $S_D$ with the frequency $f_S$ supplied from the VCO 45 is frequency-divided by the dividing factor K by the second frequency divider 43, generating the second/additional driving signal $S_{DD}$ with the frequency ($f_S$/K).

The phase comparator 44 compares in phase the offset signal $S_{OST}$ and the second/additional driving signal $S_{DD}$, outputting the error signal $S_{ER}$ proportional to the phase difference between them to the VCO 45. The VCO 45 operates to keep the frequency of the driving signal $S_D$ at $f_S$ according to the voltage of the error signal $S_{ER}$.

With the apparatus according to the third embodiment comprising the PLL circuit 41 of FIG. 6, the electrical offset signal $S_{OST}$ (frequency: $\Delta f = f_0/(N \cdot M)$) outputted from the first frequency divider 42 is generated by frequency-dividing the electrical sinusoidal signal $S_{SIN}$ (frequency: $f_0/N$) generated from the clock light $LT_{CLK}$ (repetition frequency: $f_0/N$), where the clock light $LT_{CLK}$ is synchronized with the target light $LT_0$ (repetition frequency: $f_0$). Therefore, the offset signal $S_{OST}$ is synchronized with the target light $LT_0$. In this case, if the frequency of the driving signal $S_D$ outputted from the VCO 45 is kept at $f_S$ [$=(f_0/N)-\Delta f$], the phase of the driving signal $S_D$ is always synchronized with the phase of the target light $LT_0$.

As a result, there are approximately the same advantages as those in the measuring device 100 according to the first embodiment. Moreover, since the frequency mixer 21, the LPF 22 or BPF 34 are unnecessary, the configuration is simpler than the first or second embodiment.

Fourth Embodiment

Figure 7:
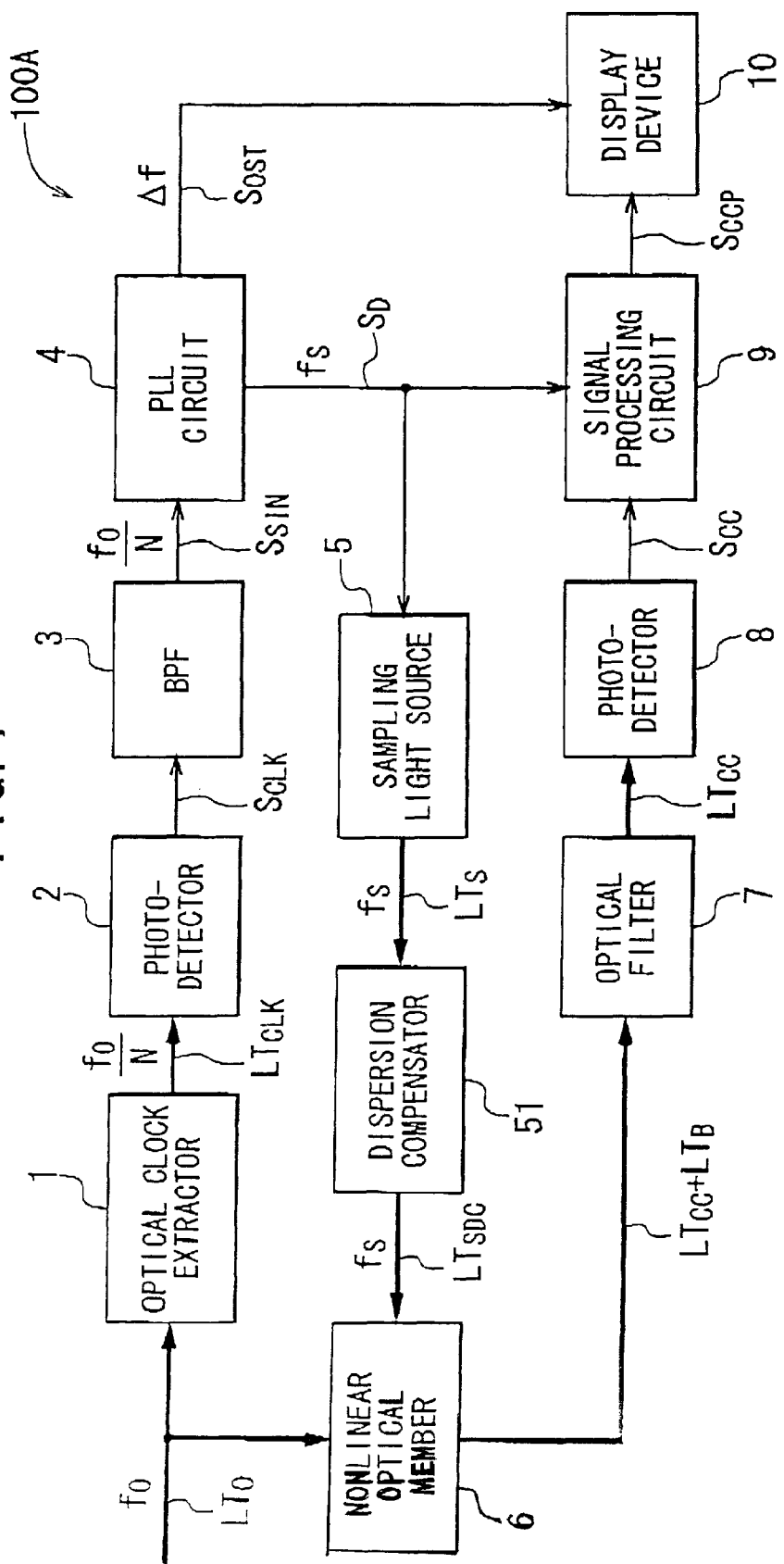
FIG. 7 is a schematic block diagram showing the configuration of an optical measuring apparatus according to a fourth embodiment of the invention.

FIG. 7 shows an apparatus 100A for measuring the waveform of sampling light according to a fourth embodiment of the invention, which has the same configuration as the apparatus 100 according to the first embodiment of FIG. 2 except that a dispersion compensator 51 is additionally provided between the sampling light source 5 and the nonlinear optical member 6. Therefore, the explanation about the same configuration and operation is omitted here for the simplification by attaching the same reference symbols as used in the first embodiment in FIG. 7.

With the above-described apparatus 100 according to the first embodiment of FIG. 2, the sampling light $LT_S$ emitted from the sampling light source 5 is directly supplied to the nonlinear optical member 6. In this case, however, if the pulse width (on the time axis) of the sampling light $LT_S$ is comparatively wide, there is a possibility that the time resolution of the apparatus 100 degrades.

On the other hand, with the apparatus 100A according to the fourth embodiment of FIG. 7, the sampling light $LT_S$ emitted from the sampling light source 5 enters the nonlinear optical member 6 by way of the dispersion compensator 51. Thus, the sampling light $LT_{SDC}$ passing through the compensator 51 has the narrowed pulse widths. This eliminates the possibility that the time resolution of the apparatus 100A degrades and at the same time, it may raise the time resolution.

As the dispersion compensator 51, any type of dispersion compensator may be used. Preferably, a dispersion-compensating optical fiber is used as the compensator 51.

Fifth Embodiment

Figure 8:
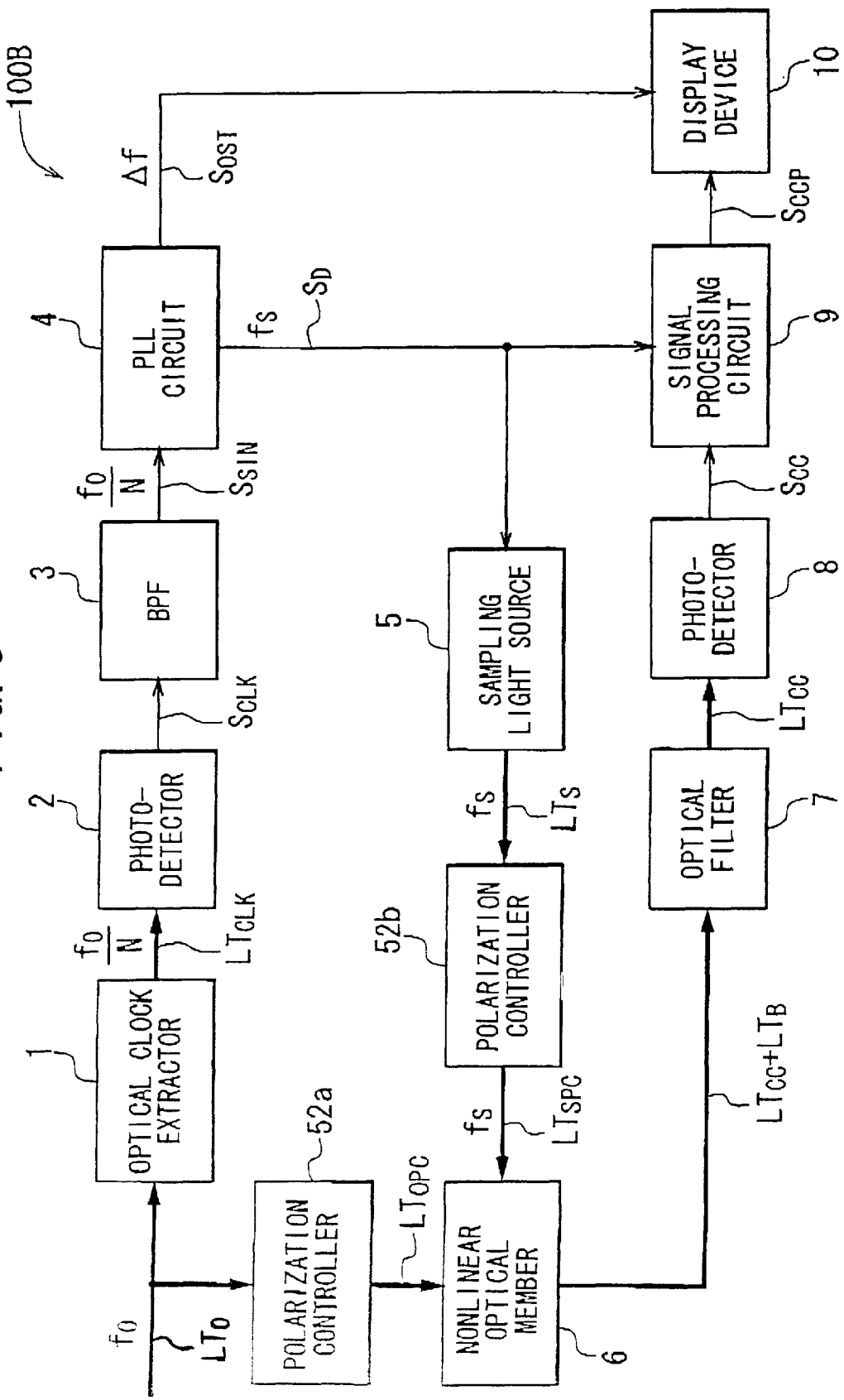
FIG. 8 is a schematic block diagram showing the configuration of an optical measuring apparatus according to a fifth embodiment of the invention.

FIG. 8 shows an apparatus 100B for measuring the waveform or sampling light according to a fifth embodiment of FIG. 2, which has the same configuration as the apparatus 100 according to the first embodiment except that two polarization controllers 52a and 52b are additionally provided.

The first polarization controller 52a for controlling the polarization state of incident light is provided between the input port or inlet (not shown) of the apparatus 100B and the nonlinear optical member 6. The second polarization controller 52b for controlling the polarization state of incident light is provided between the sampling light source 5 and the same member 6. Therefore, the explanation about the same configuration is omitted here for the simplification by attaching the same reference symbols as used in the first embodiment in FIG. 8.

With the above-described apparatus 100 according to the first embodiment of FIG. 2, the target light $LT_0$ is directly supplied to the nonlinear optical member 6 while the sampling light $LT_S$ emitted from the sampling light source 5 is directly supplied to the same member 6.

Unlike this, with the apparatus 100B according to the fifth embodiment of FIG. 8, the target light $LT_0$ is supplied to the nonlinear optical member 6 by way of the first polarization controller 52a and at the same time, the sampling light $LT_S$ emitted from the sampling light source 5 is supplied to the same member 6 by way of the second polarization controller 52b. This is to optimize the polarization states of the target light $LT_0$ and the sampling light $LT_S$ prior to entering the member 6, thereby increasing the intensity of the cross-correlated light $LT_{CC}$ generated by the nonlinear optical effect in the member 6. This is on the basis of the fact that the intensity of the cross-correlated light $LT_{CC}$ varies dependent strongly on the polarization state of the incoming light $LT_0$ and $LT_S$.

As a result, the apparatus 100B according to the fifth embodiment has an additional advantage that the measurement sensitivity is raised compared with the apparatus 100 according to the first embodiment.

Sixth Embodiment

Figure 9:
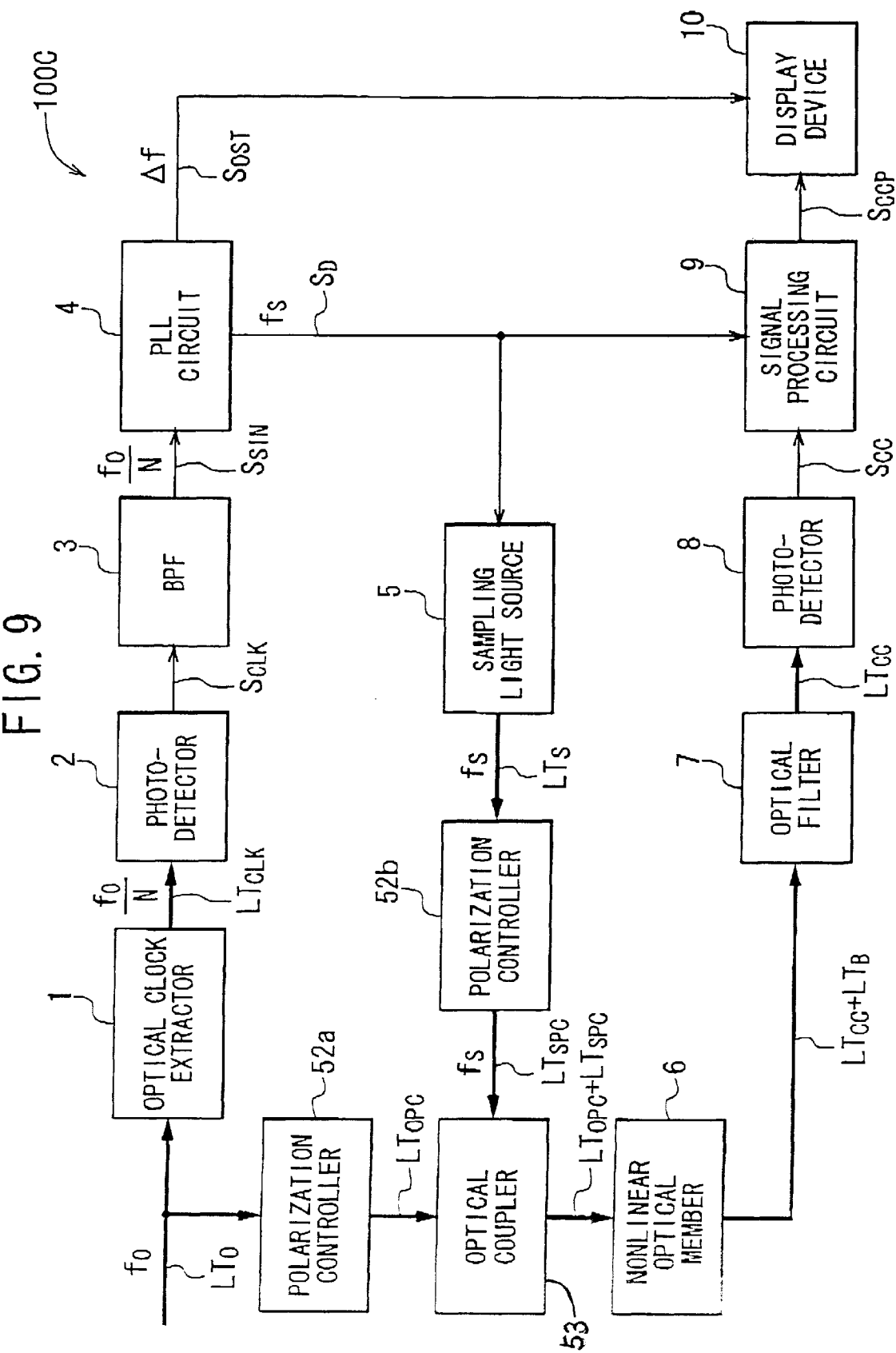
FIG. 9 is a schematic block diagram showing the configuration of an optical measuring apparatus according to a sixth embodiment of the invention.

FIG. 9 shows an apparatus 100C for measuring the waveform of sampling light according to a sixth embodiment of the invention, which has the same configuration as the apparatus 100B according to the fifth embodiment of FIG. 8 except that an optical coupler 53 is additionally provided.

The coupler 53 is provided so as to couple the polarization-controlled target light $LT_{OPC}$ outputted from the first polarization controller 52a with the polarization-controlled sampling light $LT_{SPC}$ outputted from the second polarization controller 52b. The polarization-controlled target light $LT_{OPC}$ and the polarization-controlled sampling light $LT_{SPC}$ thus coupled is supplied to the nonlinear optical member 6. Therefore, the explanation about the same configuration is omitted here for the simplification by attaching the same reference symbols as used in the fifth embodiment in FIG. 9.

With the drive 100C according to the sixth embodiment of FIG. 9, the same advantages as those in the fifth embodiment are given.

Seventh Embodiment

Figure 10:
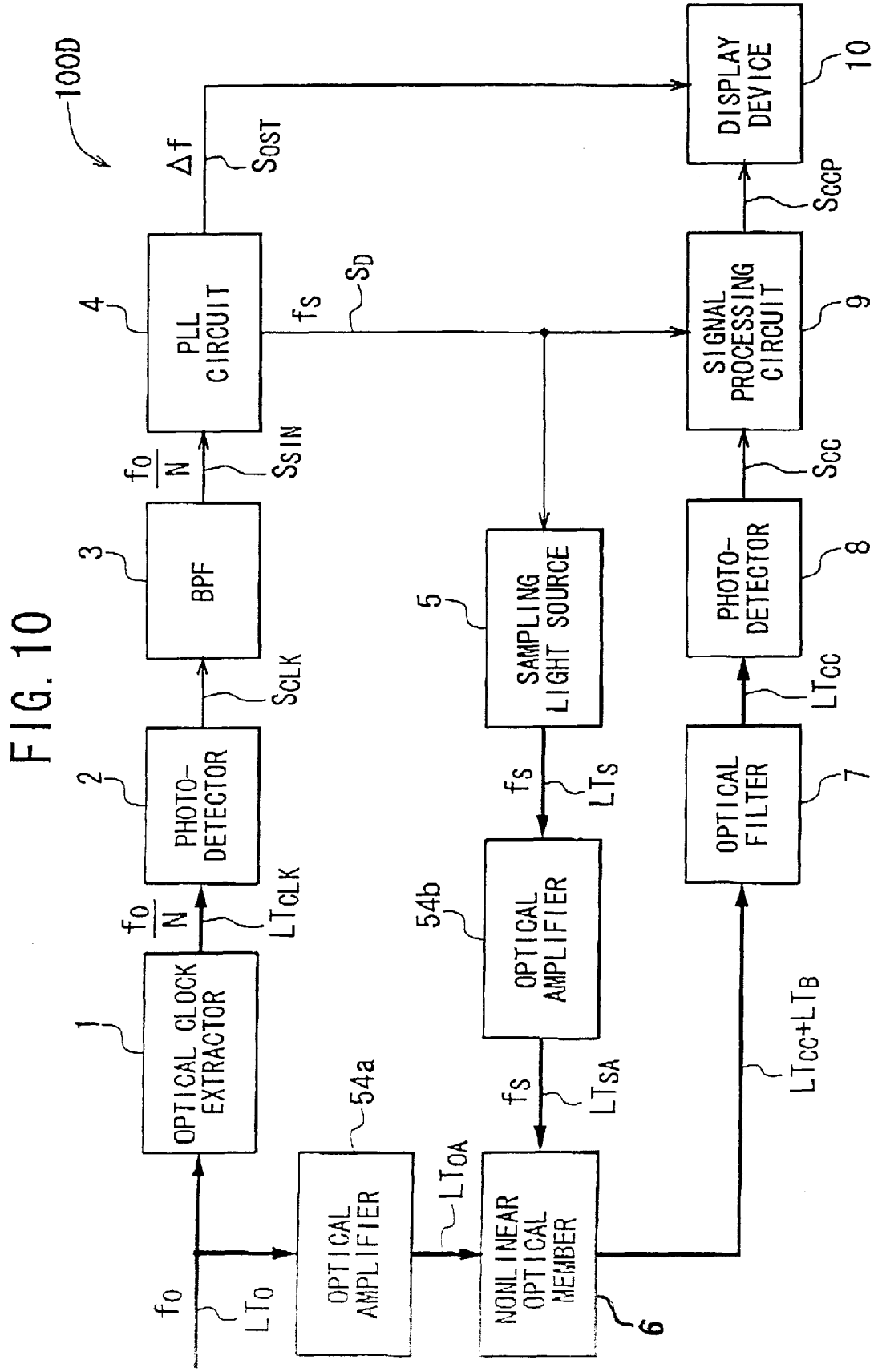
FIG. 10 is a schematic block diagram showing the configuration of an optical measuring apparatus according to a seventh embodiment of the invention.

FIG. 10 shows an apparatus 100D for measuring the waveform of sampling light according to a seventh embodiment of the invention, which has the same configuration as the apparatus 100 according to the first embodiment of FIG. 2 except that two optical amplifiers 54a and 54b are additionally provided.

The first optical amplifier 54a is provided between the input port (not shown) of the apparatus 100D and the nonlinear optical member 6. The second optical amplifier 54b is provided between the sampling light source 5 and the same member 6. Therefore, the explanation about the same configuration is omitted here for the simplification by attaching the same reference symbols as used in the first embodiment in FIG. 10.

With the above-described apparatus 100 according to the first embodiment, the target light $LT_O$ and the sampling light $LT_S$ is directly supplied to the nonlinear optical member 6. Unlike this, with the apparatus 100D according to the seventh embodiment of FIG. 10, the amplified target light $LT_{OA}$ outputted from the first optical amplifier 54a and the amplified sampling light $LT_S$ outputted from the second optical amplifier 54b is supplied to the nonlinear optical member 6. This is to enhance the intensity of the target light $LT_O$ and the sampling light $LT_S$ prior to entering the member 6, thereby increasing the intensity of the cross-correlated light $LT_{CC}$ generated by the nonlinear optical effect in the member 6. This is based on the fact that the intensity of the cross-correlated light $LT_{CC}$ varies proportional to the intensity of the incoming light $LT_O$ and $LT_S$ if the member 6 is made of material representing the secondary nonlinear optical effect. Also, this is based on the fact that the intensity of the cross-correlated light $LT_{CC}$ varies proportional to the square of the intensity of the incoming light $LT_O$ and $LT_S$ if the member 6 is made of material representing the tertiary nonlinear optical effect.

As a result, the apparatus 100D according to the seventh embodiment of FIG. 10 has an additional advantage that the measurement sensitivity is raised compared with the apparatus 100 according to the first embodiment.

For example, when the wavelengths of the target light $LT_O$ and the sampling light $LT_S$ is in the 1.3 μm band and the 1.5 μm band, respectively, an optical fiber amplifier doped with a rare-earth element or a semiconductor optical amplifier may be used as the optical amplifiers 54a and 54b. In this case, he amplifiers 54a and 54b emit undesired, amplified optical components (e.g., light due to spontaneous emission) and thus, it is preferred that an optical band-pass filter is additionally provided to selectively pass the target light $LT_O$ and the sampling light $LT_S$. If so, the measurement sensitivity is raised furthermore.

Eighth Embodiment

Figure 11:
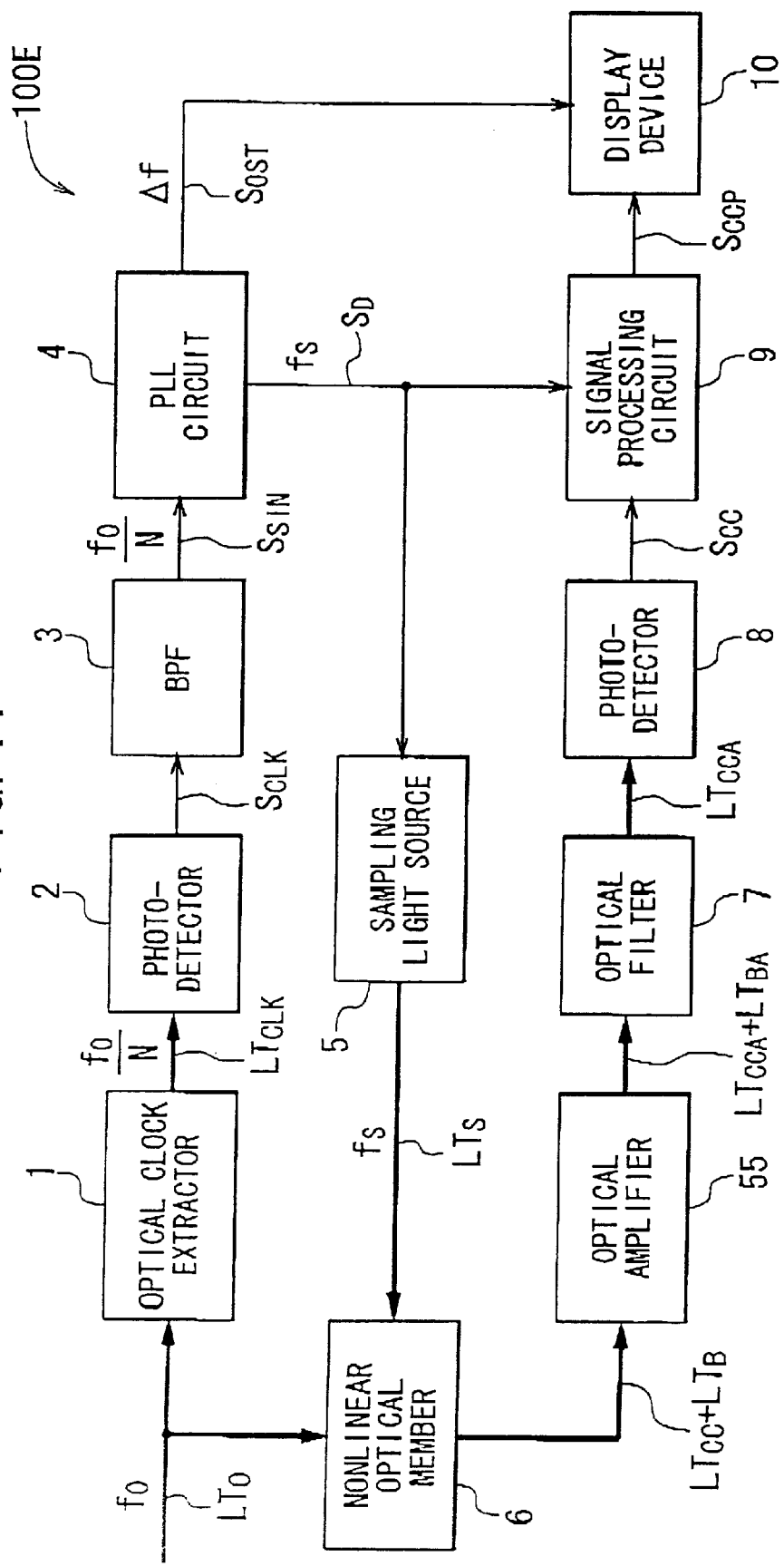
FIG. 11 is a schematic block diagram showing the configuration of an optical measuring apparatus according to an eighth embodiment of the invention.

FIG. 11 shows an apparatus 100E for measuring the waveform of sampling light according to an eighth embodiment of the invention, which has the same configuration as the apparatus 100 according to the first embodiment except that an optical amplifier 55 is additionally provided. The optical amplifier 55 is located between the nonlinear optical member 6 and the optical filter 7. Therefore, the explanation about the same configuration is omitted here for the simplification by attaching the same reference symbols as used in the first embodiment in FIG. 11.

With the apparatus 100E according to the eighth embodiment of FIG. 11, the amplified cross-correlated light $LT_{CC}$ and the amplified background light $LT_{BA}$ outputted by the optical amplifier 55 enters the optical filter 7. Thus, the amplified cross-correlated light $LT_{CC}$ is applied to the photodetector 8, which means that the intensity of the light $LT_{CC}$ is enhanced. As a result, the apparatus 100E according to the eighth embodiment has an additional advantage that the measurement sensitivity is raised compared with the apparatus 100 according to the first embodiment of FIG. 2.

Ninth Embodiment

Figure 12:
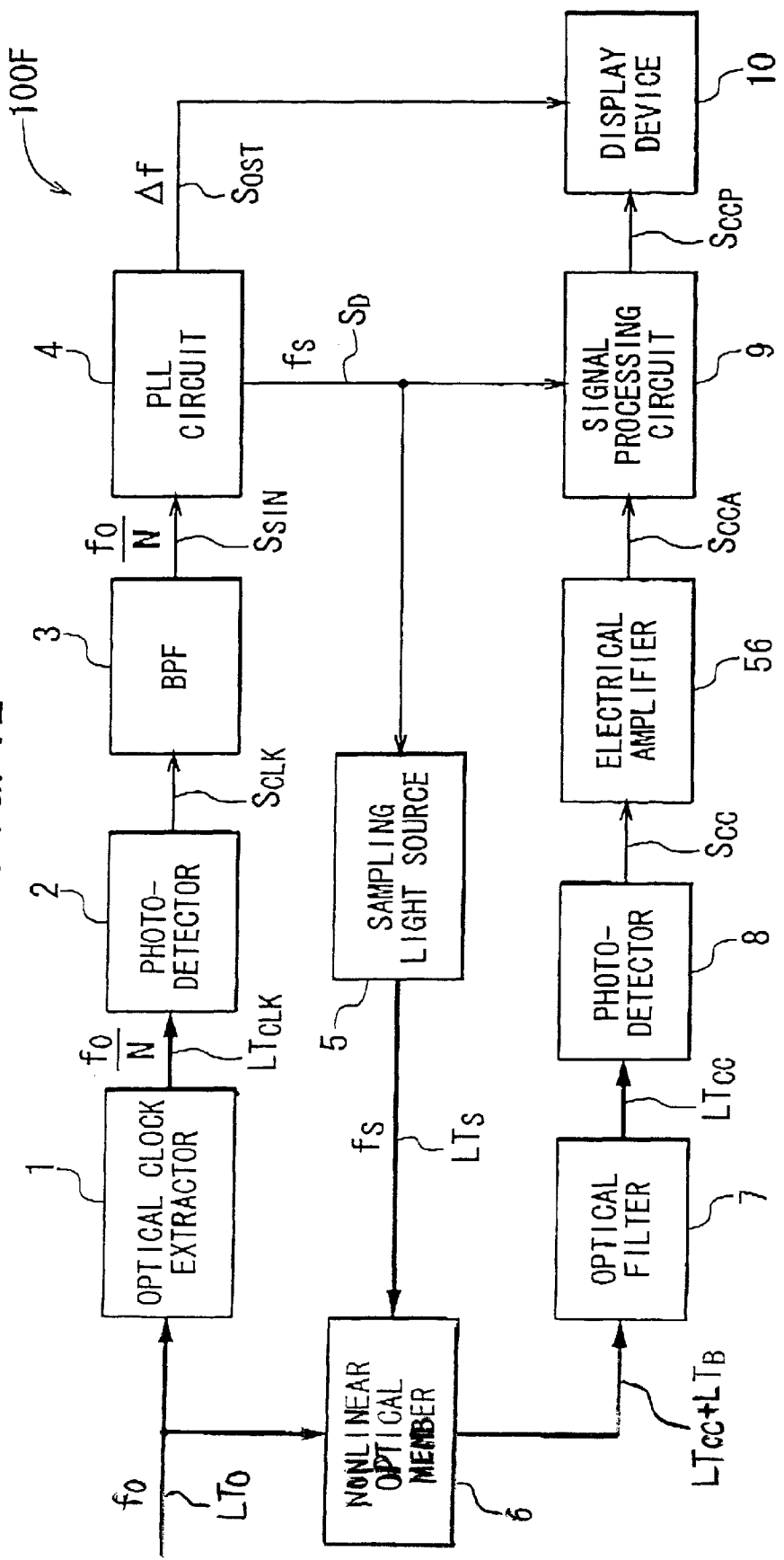
FIG. 12 is a schematic block diagram showing the configuration of an optical measuring apparatus according to a ninth embodiment of the invention.

FIG. 12 shows an apparatus 100F for measuring the waveform of sampling light according to a ninth embodiment of the invention, which has the same configuration as the apparatus 100 according to the first embodiment except that an electrical amplifier 56 is additionally provided. The electrical amplifier 56 is located between the photodetector 8 and the signal processing circuit 9. Therefore, the explanation about the same configuration is omitted here for the simplification by attaching the same reference symbols as used in the first embodiment in FIG. 12.

With the apparatus 100F according to the ninth embodiment of FIG. 12, the electrical pulsed signal $S_{CC}$ outputted by the photodetector 8 is amplified by the amplifier 56, thereby supplying the amplified electrical signal $S_{CCA}$ to the signal processing circuit 9. As a result, the apparatus 100F according to the eighth embodiment has an additional advantage that the measurement sensitivity is raised compared with the apparatus 100 according to the first embodiment.

Tenth Embodiment

Figure 13:
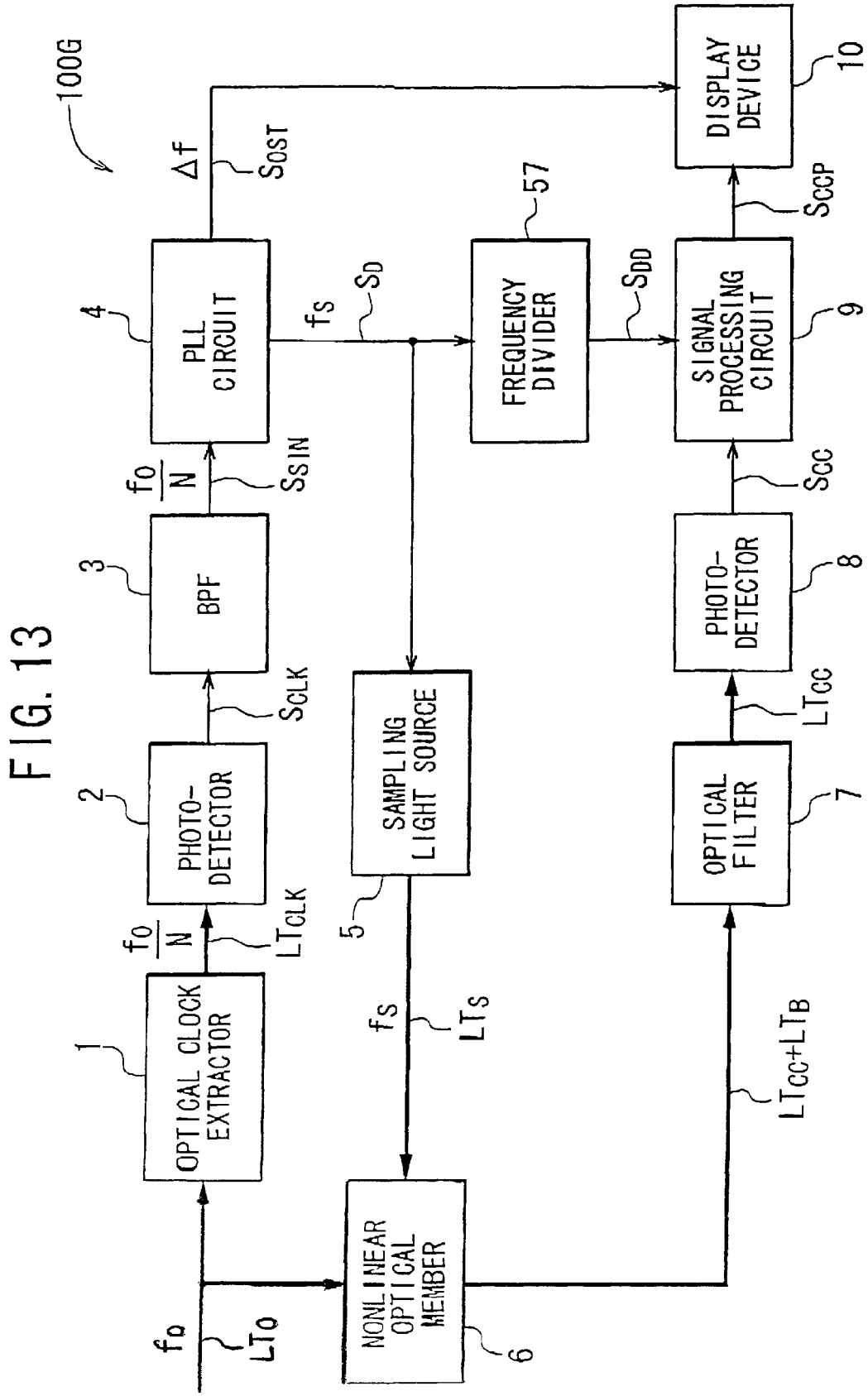
FIG. 13 is a schematic block diagram showing the configuration of an optical measuring apparatus according to a tenth embodiment of the invention.

FIG. 13 shows an apparatus 100G for measuring the waveform of sampling light according to a tenth embodiment of the invention, which has the same configuration as the apparatus 100 according to the first embodiment except that a frequency-divider 57 is additionally provided. The frequency-divider 57 is located between the PLL circuit 4 and the signal processing circuit 9. Therefore, the explanation about the same configuration is omitted here for the simplification by attaching the same reference symbols as used in the first embodiment in FIG. 13.

With the apparatus 100 according to the first embodiment of FIG. 2, the electrical driving signal $S_D$ from the PLL circuit 4 is directly supplied to the signal processing circuit 9 and therefore, the signal $S_D$ itself is used for sampling in the circuit 9. Unlike this, with the apparatus 100G according to the tenth embodiment of FIG. 13, the driving signal $S_D$ is frequency-divided by the frequency-divider 57 and therefore, the frequency-divided driving signal $S_{DD}$ is used for sampling in the circuit 9.

For example, if the frequency of the driving signal $S_D$ is divided by the factor of 10, the count of the peak values of the cross-correlated signal $LT_{CC}$ represented by the circular dots in FIG. 14 is decreased to one-tenth (i.e., 1/10). This means that the sampling rate is lowered to one-tenth compared with the first embodiment.

The lowering of the sampling rate in the signal processing circuit 9 produces an additional advantage that the load applicable to the conversion operation from analog signals to digital ones in the circuit 9 can be reduced compared with the apparatus 100 according to the first embodiment.

Variations

In the above-describe first to tenth embodiments of the invention, a passive mode-locked semiconductor laser 13 is used to configure the optical clock extractor 1. However, the invention is not limited to this. Any other mode-locked laser may be used for this purpose.

In the above-described embodiments, the invention is applied to measurement of the waveform of ultra-high speed optical pulses having a data transmission rate that exceeds about 40 Gb/s in each wavelength in real time with sufficiently high time resolution. However, the invention is not limited to this case. Needless to say, the invention may be applied to cases where the measuring apparatus is electrically connected to the external apparatus by way of a comparatively short optical transmission path, or to cases where the waveform of optical pulses having a data transmission rate that equal to or less than about 40 Gb/s in each wavelength is measured in real time with sufficiently high time resolution.

Moreover, the PLL circuit 31 or 41 used in the second or third embodiment may be used in any one of the fourth to tenth embodiments. If the elements or devices additionally provided in the fourth to tenth embodiments are suitably combined together, any other embodiments maybe created easily. Needless to say, these embodiments thus created are included in the invention.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A method a pulse waveform of target light, comprising the steps of:
    (a) generating sampling light having a pulse width narrower than that of target light from the target light, the sampling light having a repetition frequency and the target light having a repetition frequency, the repetition frequency of the sampling light having a constant difference with respect to the repetition frequency of the target light;
    (a-1) extracting clock light from the target light, the clock light being synchronized with the target light;
    (a-2) generating an electrical clock signal from the clock light;
    (a-3) generating an electrical driving signal in such a way that a constant frequency difference exists between a frequency of the electrical driving signal and a frequency of the electrical clock signal; and
    (a-4) generating the sampling light based on the electrical driving signal
    (b) supplying the sampling light and the target light to a nonlinear optical member to generate cross-correlated light between the sampling light and the target light; and
    (c) measuring a waveform of the target light based on the cross-correlated light.

2. The method according to claim 1, wherein in the substep (a-1) of extracting the clock light from the target light, the target light is supplied to a passive mode-locked laser, thereby generating the clock light; and
    wherein the clock light has a repetition frequency (1/N) times as much as a repetition frequency of the target light, where N is a natural number.

3. The method according to claim 2, wherein a passive mode-locked semiconductor laser is used as the passive mode-locked laser.

4. The method according to claim 1, wherein in the substep (a-3) of generating the electrical driving signal,
    an electrical offset signal is generated by frequency-dividing the clock signal;
    an electrical difference-frequency signal is generated by frequency-mixing the electrical offset signal and the electrical difference-frequency signal together; and
    the electrical driving signal is generated based on a phase difference between the electrical offset signal and the electrical difference-frequency signal.

5. The method according to claim 4, further comprising the steps of:
    (d) generating an electrical cross-correlated signal from the cross-correlated light;
    (e) sampling peak values of the electrical cross-correlated signal; and
    (f) displaying an eye pattern corresponding to the electrical cross-correlated signal on a screen of a display device by repeatedly writing waveforms of the electrical cross-correlated signal while the electrical offset signal is used as a trigger.

6. The method according to claim 5, wherein the step (e) of sampling the peak values of the electrical cross-correlated signal is performed to be synchronized with an electrical signal generated by frequency-dividing the electrical driving signal.

7. The method according to claim 1, wherein in the substep (a-3) of generating the electrical driving signal,
    an electrical offset signal is generated by frequency-dividing the clock signal;
    and electrical difference-frequency signal is and the electrical clock signal together; and
    the electrical driving signal is generated based on a phase difference between the electrical driving signal and the electrical difference-frequency signal.

8. The method according to claim 7, further comprising the steps of:
    (d) generating an electrical cross-correlated signal from the cross-correlated light;
    (e) sampling peak values of the electrical cross-correlated signal; and
    (f) displaying an eye pattern corresponding to the electrical cross-correlated signal on a screen of a display device by repeatedly writing waveforms of the electrical cross-correlated signal while the electrical offset signal is used as a trigger.

9. The method according to claim 8, wherein the step (e) of sampling the peak values of the electrical cress-correlated signal is performed to be synchronized with an electrical signal generated by frequency-dividing the electrical driving signal.

10. The method according to claim 1, wherein in the substep (a-3) of generating the electrical driving signal,
    an electrical offset signal is generated by frequency-dividing the clock signal;
    an electrical, additional driving signal is generated by frequency-dividing the electrical driving signal; and
    the electrical driving signal is generated based on a phase difference between the electrical offset signal and the electrical, additional driving signal.

11. The method according to claim 10, further comprising the steps of:
    (d) generating an electrical cross-correlated signal from the cross-correlated light;
    (e) sampling peak values of the electrical cross-correlated signal; and
    (f) displaying an eye pattern corresponding to the electrical cross-correlated signal on a screen of a display device by repeatedly writing waveforms of the electrical cross-correlated signal while the electrical offset signal is used as a trigger.

12. The method according to claim 11, wherein the step (e) of sampling the peak values of the electrical cross-correlated signal is performed to be synchronized with an electrical signal generated by frequency-dividing the electrical driving signal.

13. (Amended) An apparatus for measuring a pulse waveform of target light, comprising:
    (a) a sampling light generator for generating sampling light having a pulse width narrower than that of the target light from the target light, the sampling light having a repetition frequency and the target light having a repetition frequency, the repetition frequency of the sampling light having a constant difference with respect to the repetition frequency of the target light;

(a-1) a clock light extractor for extracting clock light from the target light, the clock light being synchronized with the target light;

(a-2) an electrical clock signal generator for generating an electrical clock signal from the clock light;

(a-3) an electrical driving signal generator for generating an electrical driving signal in such a way that a constant frequency difference exists between a frequency of the electrical driving signal and a frequency of the electrical clock signal; and (a-4) a sampling light generator for generating the sampling light based on the electrical driving signal;

(b) a cross-correlated light generator for generating a cross-correlated light between the sampling light and the target light by supplying the sampling light and the target light to a nonlinear optical member; and (c) a measuring device for measuring waveform of the target light based on the cross-correlated light.

14. The apparatus according to claim 13, wherein the clock light extractor comprises a passive mode-locked laser;

the target light being supplied to the passive mode-locked laser, thereby generating the clock light;

the clock light having a repetition frequency (1/N) times as much as a repetition frequency of the target light, where N is a natural number.

15. The apparatus according to claim 14, wherein a passive mode-locked semiconductor laser is used as the passive mode-locked laser.

16. The apparatus according to claim 15, wherein the electrical driving signal generator comprises:

an electrical offset signal generator for generating an electrical offset signal by frequency-dividing the clock signal; and an electrical difference-frequency signal generator for generating an electrical difference-frequency signal by frequency-mixing the electrical offset signal and the electrical difference-frequency signal together;

and wherein the electrical driving signal is generated based on a phase difference between the electrical offset signal and electrical difference-frequency signal.

17. The apparatus according to claim 16, further comprising:

an electrical cross-correlated signal generator for generating an electrical cross-correlated signal from the cross-correlated light;

a peak value sampler for sampling peak values of the electrical cross-correlated signal; and a display device for displaying an eye pattern corresponding to the electrical cross-correlated signal on a screen of a display device by repeatedly writing waveforms of the electrical cross-correlated signal while the electrical offset signal is used as a trigger.

18. The apparatus according to claim 17, wherein the peak value sampler samples the peak values of the electrical cross-correlated signal to be synchronized with an electrical signal generated by frequency-dividing the electrical driving signal.

19. The apparatus according to claim 13, wherein in the electrical driving signal generator;

an electrical offset signal is generated by frequency-dividing the clock signal;

an electrical difference-frequency signal is generated by frequency-mixing the electrical offset signal and the electrical clock signal together; and the electrical driving signal is generated based on a phase difference between the electrical driving signal and electrical difference-frequency signal.

20. The apparatus according to claim 19, further comprising:

(d) an electrical cross-correlated signal generator for generating an electrical cross-correlated signal from the cross-correlated light;

(e) a peak value sampler for sampling peak values of the electrical cross-correlated signal; and (f) a display device for displaying an eye pattern corresponding to the electrical cross-correlated signal on a screen of a display device by repeatedly writing waveforms of the electrical cross-correlated signal while the electrical offset signal is used as a trigger.

21. The apparatus according to claim 20, wherein the peak value sampler operates to be synchronized with an electrical signal generated by frequency-dividing the electrical driving signal.

22. The apparatus according to claim 13, wherein in the electrical driving signal generator, an electrical offset signal is generated by frequency-dividing the clock signal;

an electrical, additional driving signal is generated by frequency-dividing the electrical driving signal; and the electrical driving signal is generated based on a phase difference between the electrical offset signal and the electrical, additional driving signal.

23. The apparatus according to claim 22, further comprising:

(d) an electrical cross-correlated signal generator for generating an electrical cross-correlated signal from the cross-correlated light;

(e) a peak value sampler for sampling peak values of the electrical cross-correlated signal; and (f) a display device for displaying an eye pattern corresponding to the electrical cross-correlated signal on a screen of a display device by repeatedly writing waveforms of the electrical cross-correlated signal while the electrical offset signal is used as a trigger.

24. The apparatus according to claim 23, wherein the peak value sampler operates to be synchronized with an electrical signal generated by frequency-dividing the electrical driving signal.

25. The apparatus according to claim 13, wherein the electrical driving signal generator comprises a PLL circuit;

the PLL circuit including:

a frequency-divider for frequency-dividing the electrical clock signal to generate the electrical offset signal;

a VCO for generating the driving signal;

a frequency-mixer for frequency-mixing the electrical clock signal and the electrical driving signal, generating a difference-frequency signal; and a phase comparator for phase-comparing the offset signal and the difference-frequency signal to generate an error signal;

a frequency of the driving signal being controlled based on the error signal.

26. The apparatus according to claim 13, wherein the frequency-divider utilizes ECL.

27. The apparatus according to claim 13, wherein the measuring device comprises an optical detector for generating an electrical cross-correlated signal from the cross-correlated light, and a waveform display device for displaying an eye pattern based on the electrical cross-correlated signal.

28. The apparatus according to claim 27, wherein the waveform display device samples peak values of the electrical cross-correlated signal synchronized with an electrical signal generated by frequency-dividing the electrical driving signal.

29. The apparatus according to claim 13, wherein the electrical driving signal generator comprises a PLL circuit;

the PLL circuit including:
a frequency-divider for frequency-dividing the electrical clock signal to generate the electrical offset signal;
a VCO for generating the driving signal;
a frequency-mixer for frequency-mixing the electrical clock signal and the electrical offset signal, generating a difference-frequency signal; and
a phase comparator for phase-comparing the driving signal and the difference-frequency signal to generate an error signal;
a frequency of the driving signal being controlled based on the error signal.

30. The apparatus according to claim 29, wherein the frequency-divider utilizes ECL.

31. The apparatus according to claim 29, wherein the measuring device comprises an optical detector for generating an electrical cross-correlated signal from the cross-correlated light, and a waveform display device for displaying an eye pattern based on the electrical cross-correlated signal.

32. The apparatus according to claim 31, wherein the waveform display device samples peak values of the electrical cross-correlated signal synchronized with an electrical signal generated by frequency-dividing the electrical driving signal.

33. The apparatus according to claim 13, wherein the electrical driving signal generator comprises a PLL circuit;

the PLL circuit including:
first frequency-divider for frequency-dividing the electrical clock signal to generate the electrical offset signal;
a VCO for generating the driving signal;
a second frequency-divider for frequency-dividing the driving signal to generate an additional, electrical driving signal; and
a phase comparator for phase-comparing the offset signal and the additional, electrical driving signal to generate an error signal;
a frequency of the driving signal being controlled based on the error signal.

34. The apparatus according to claim 33, wherein the frequency-divider utilizes ECL.

35. The apparatus according to claim 33, wherein the measuring device comprises an optical detector for generating an electrical cross-correlated signal from the cross-correlated light, and a waveform display device for displaying an eye pattern based on the electrical cross-correlated signal.

36. The apparatus according to claim 34, wherein the waveform display device samples peak values of the electrical cross-correlated signal synchronized with an electrical signal generated by frequency-dividing the electrical driving signal.

* * * * *